US009068653B2

(12) United States Patent
Terada et al.

(10) Patent No.: US 9,068,653 B2
(45) Date of Patent: Jun. 30, 2015

(54) SEALING MATERIAL

(75) Inventors: Junpei Terada, Settsu (JP); Daisuke Ota, Settsu (JP); Masanori Kitaichi, Settsu (JP); Yutaka Ueta, Settsu (JP); Shigeru Morita, Settsu (JP); Kazuyoshi Kawasaki, Settsu (JP); Tatsuya Morikawa, Settsu (JP); Shoji Fukuoka, Settsu (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 0 days.

(21) Appl. No.: 13/217,769

(22) Filed: Aug. 25, 2011

(65) Prior Publication Data

US 2012/0077925 A1    Mar. 29, 2012

Related U.S. Application Data

(60) Provisional application No. 61/377,034, filed on Aug. 25, 2010.

(51) Int. Cl.
| F16J 15/10 | (2006.01) |
| C09K 3/10 | (2006.01) |
| C08K 3/04 | (2006.01) |
| C08K 5/00 | (2006.01) |
| C08L 27/12 | (2006.01) |
| C08L 27/16 | (2006.01) |
| C08L 27/20 | (2006.01) |

(52) U.S. Cl.
CPC ............ *F16J 15/102* (2013.01); *C08K 5/0025* (2013.01); *C08L 27/20* (2013.01); *C08K 3/04* (2013.01); *C08L 27/16* (2013.01); *C08L 27/12* (2013.01); *C09K 3/1009* (2013.01)

(58) Field of Classification Search
CPC ........ F16J 15/102; C09K 3/1009; C08K 3/04; C08K 5/0025; C08L 27/12; C08L 27/16; C08L 27/18; C08L 27/20
USPC ....................................................... 524/495
See application file for complete search history.

(56) References Cited

U.S. PATENT DOCUMENTS

| 4,467,074 A | 8/1984 | Oka et al. |
| 4,543,394 A | 9/1985 | Finlay et al. |
| 4,694,045 A * | 9/1987 | Moore ........................... 525/276 |
| 4,737,526 A | 4/1988 | Mukaiyama et al. |
| 4,925,892 A | 5/1990 | Tabb et al. |
| 5,679,728 A | 10/1997 | Kawazura et al. |
| 5,891,941 A | 4/1999 | Tanaka et al. |
| 5,902,857 A | 5/1999 | Wlassics et al. |
| 5,948,868 A | 9/1999 | Albano et al. |
| 6,232,390 B1 | 5/2001 | Ono et al. |
| 6,303,699 B1 | 10/2001 | Naraki et al. |
| 6,367,525 B1 | 4/2002 | Hiruma et al. |
| 6,543,785 B1 | 4/2003 | Katayama et al. |
| 6,878,778 B1 * | 4/2005 | Kawasaki et al. .............. 525/275 |
| 7,368,506 B2 | 5/2008 | Kanenari |
| 8,609,774 B2 * | 12/2013 | Terada et al. .................. 525/192 |
| 2004/0048983 A1 | 3/2004 | Hochgesang et al. |
| 2005/0147828 A1 | 7/2005 | Verschuere et al. |
| 2005/0256233 A1 * | 11/2005 | Ocho et al. ....................... 524/59 |
| 2005/0282969 A1 | 12/2005 | Comino et al. |
| 2006/0058450 A1 | 3/2006 | Amemiya et al. |
| 2007/0219332 A1 * | 9/2007 | Washino et al. ............... 526/247 |
| 2008/0075904 A1 | 3/2008 | Kawasaki et al. |
| 2008/0275184 A1 | 11/2008 | Karato et al. |
| 2008/0306196 A1 | 12/2008 | Irie et al. |
| 2009/0011164 A1 | 1/2009 | Masuda et al. |
| 2010/0069558 A1 | 3/2010 | Stanga et al. |
| 2010/0209644 A1 | 8/2010 | Abe et al. |
| 2010/0266839 A1 | 10/2010 | Omura et al. |
| 2010/0286329 A1 | 11/2010 | Fukushi et al. |
| 2011/0152487 A1 | 6/2011 | Cook et al. |
| 2012/0067706 A1 | 3/2012 | Terada et al. |
| 2012/0073696 A1 | 3/2012 | Terada et al. |
| 2012/0077924 A1 | 3/2012 | Ota et al. |
| 2012/0077926 A1 | 3/2012 | Ota et al. |
| 2012/0077927 A1 | 3/2012 | Ota et al. |
| 2012/0077938 A1 | 3/2012 | Ota et al. |
| 2012/0077939 A1 | 3/2012 | Ota et al. |
| 2012/0095150 A1 | 4/2012 | Ota et al. |

(Continued)

FOREIGN PATENT DOCUMENTS

| CN | 1738854 A | 2/2006 |
| CN | 1989202 A | 6/2007 |

(Continued)

OTHER PUBLICATIONS

Wang, M.-J., Gray, C. A., Reznek, S. R., Mahmud, K. and Kutsovsky, Y. 2003. Carbon Black. Encyclopedia of Polymer Science and Technology.*
International Search Report mailed Dec. 6, 2011 for corresponding PCT Application No. PCT/JP2011/069234.
Extended European Search Report issued on Jan. 31, 2014 for EP Appln. No. 11820017.9.
Extended European Search Report issued on Feb. 3, 2014 for EP Appln. No. 11820014.6.
Extended European Search Report issued on Feb. 11, 2014 for EP Appln. No. 11820021.1.

(Continued)

*Primary Examiner* — Angela C Scott
(74) *Attorney, Agent, or Firm* — Sughrue Mion, PLLC

(57) ABSTRACT

To provide a sealing material which is excellent in sealability under high-temperature conditions as well as crack resistance at high temperatures and high compression. A sealing material comprising a cross-linked fluororubber layer obtainable by cross-linking a fluororubber composition containing a fluororubber (A) and a carbon black (B), the cross-linked fluororubber layer having a loss modulus E" of 600 kPa or higher and 6,000 kPa or lower determined by a dynamic viscoelasticity test under conditions of measurement temperature: 160° C., tensile strain: 1%, initial force: 157 cN, and frequency: 10 Hz.

4 Claims, No Drawings

(56) References Cited

U.S. PATENT DOCUMENTS

| | | |
|---|---|---|
| 2012/0095151 A1 | 4/2012 | Terada et al. |
| 2012/0202938 A1 | 8/2012 | Kawai et al. |

FOREIGN PATENT DOCUMENTS

| | | |
|---|---|---|
| CN | 101871406 A | 10/2010 |
| EP | 0137216 A2 | 4/1985 |
| EP | 0168020 A2 | 1/1986 |
| EP | 0 634 456 A1 | 1/1995 |
| EP | 0 743 329 A1 | 11/1996 |
| EP | 2 108 666 A1 | 10/2009 |
| EP | 2 264 100 A1 | 12/2010 |
| JP | 52-078951 | 7/1977 |
| JP | 56-086948 A | 7/1981 |
| JP | 58-037041 A | 3/1983 |
| JP | 60-055050 A | 3/1985 |
| JP | 61-057641 A | 3/1986 |
| JP | 62-252435 A | 11/1987 |
| JP | 63-286340 A | 11/1988 |
| JP | 03-122153 A | 5/1991 |
| JP | 03-217482 A | 9/1991 |
| JP | 05-086236 A | 4/1993 |
| JP | 06-001891 A | 1/1994 |
| JP | 06-025500 A | 2/1994 |
| JP | 07-233331 A | 9/1995 |
| JP | 08-134269 A | 5/1996 |
| JP | 08-277347 A | 10/1996 |
| JP | 09-124870 A | 5/1997 |
| JP | 09-124871 A | 5/1997 |
| JP | 09-188793 A | 7/1997 |
| JP | 11-344165 A | 12/1999 |
| JP | 2000-193152 A | 7/2000 |
| JP | 2000-240730 A | 9/2000 |
| JP | 2001-049048 A | 2/2001 |
| JP | 2001-150595 A | 6/2001 |
| JP | 2001-192482 A | 7/2001 |
| JP | 2003-013041 A | 1/2003 |
| JP | 2003-083479 A | 3/2003 |
| JP | 2004-210830 A | 7/2004 |
| JP | 2005-003878 A | 1/2005 |
| JP | 2005-067279 A | 3/2005 |
| JP | 2005-239835 A | 9/2005 |
| JP | 2005-315415 A | 11/2005 |
| JP | 2006-009010 A | 1/2006 |
| JP | 2006-022917 A | 1/2006 |
| JP | 2006-052399 A | 2/2006 |
| JP | 2007-040363 A | 2/2007 |
| JP | 2007-126539 A | 5/2007 |
| JP | 2007-269008 A | 10/2007 |
| JP | 2007-332216 A | 12/2007 |
| JP | 2008-127429 A | 6/2008 |
| JP | 2008-184496 A | 8/2008 |
| JP | 2009-024046 A | 2/2009 |
| JP | 2009-035578 A | 2/2009 |
| JP | 2009-102571 A | 5/2009 |
| JP | 2009-138053 A | 6/2009 |
| JP | 2009-541562 A | 11/2009 |
| JP | 2009-298949 A | 12/2009 |
| JP | 2010-100777 A | 5/2010 |
| WO | 95/15359 A1 | 6/1995 |
| WO | WO 03074625 A1 | 9/2003 |
| WO | 2004/067618 A1 | 8/2004 |
| WO | WO 2006040944 A1 | 4/2006 |
| WO | WO 2008003634 A1 | 1/2008 |
| WO | WO 2008003635 A1 | 1/2008 |
| WO | WO 2008003636 A1 | 1/2008 |
| WO | 2008/078738 A1 | 7/2008 |
| WO | 2009/036131 A2 | 3/2009 |
| WO | 2009/119409 A1 | 10/2009 |

OTHER PUBLICATIONS

Database CA (online); Chemical Abstracts Service; Kai, Yoshimasa et al.; "Fluorine-containing elastomeric copolymer compositions with good flowability and vulcanized rubber therefrom"; XP-002719217.

Extended European Search Report dated Dec. 4, 2014, issued by the European Patent Office in related European Application No. 11819997.5.

Extended European Search Report dated Nov. 26, 2014, issued by the European Patent Office in related European Application No. 11820016.1.

Communication dated Mar. 2, 2015, issued by the European Patent Office in Counterpart Application No. 11820018.7 of related U.S. Appl. No. 13/217,444.

Communication dated Feb. 27, 2015, issued by the United States Patent and Trademark Office in corresponding U.S. Appl. No. 13/217,571.

* cited by examiner

SEALING MATERIAL

CROSS-REFERENCE TO RELATED APPLICATION

This application claims benefit under 35 U.S.C. §119(e) of U.S. Provisional Application No. 61/377,034 filed on Oct. 25, 2010, incorporated herein by reference in its entirety.

TECHNICAL FIELD

The present invention relates to a sealing material such as a sealing material for a sensor.

BACKGROUND ART

Sealing materials are used, for example, for oxygen sensors ($O_2$ sensors). The oxygen sensors are used, for example, for detecting an oxygen concentration in exhaust gas from internal-combustion engines of vehicles. Oxygen sensors for vehicles are generally protected by metals or the like. However, the sensors are attached to hot exhaust pipes or the like, and the inner portion of the sensors is exposed to hot exhaust gas flows containing a large amount of oxidizing substances. Therefore, the sensors need to have heat resistance, chemical resistance, and the like.

The oxygen sensors for vehicles are commonly mounted on a lower side of vehicle body floors. Examples of the sensors include sensors mounted at a lower stream of catalysts that purify exhaust gas, and sensors required to detect degradation of catalysts. In this case, the oxygen sensors for vehicles are subjected to external impacts. For example, the sensors are subjected to vibration impacts from engines and road surfaces, hit with stones, and splashed with water. Therefore, the oxygen sensors need to have mechanical shock resistance, thermal shock resistance, and waterproof properties.

The oxygen sensors for vehicles generally have a tubular shape, and have several leads for introducing air, which is reference of an oxygen concentration, into an oxygen concentration detection part, and taking away electric generating power of an oxygen-concentration detecting element located in the deep in the tube. In order to fix the leads without contacting one another at a portion of the oxygen sensors from which the leads are taken out, the leads are arranged so as to penetrate a sealing material, which is called a bush.

The sealing materials generally have a pillar shape basically, and have several previously-formed through holes that extend in a height direction of the pillar. When using such a sealing material, the leads are allowed to pass through the through holes, pressure in a diameter direction is applied to the sealing materials, and the sealing materials are crimped.

The sealing materials are compressed to some extent by crimping, thereby securely fixing the leads. The sealing materials desirably have elasticity so that sealability such as waterproof properties and airtightness is exhibited. In view of the setting position, similarly to the main body of oxygen sensors for vehicles, the sealing materials further desirably have the characteristics such as heat resistance and impact resistance. Accordingly, sealing materials produced by cross-linking fluororubber compositions comprising fluororubbers with the above characteristics have been commonly used.

The sealing materials easily generate cracks if stress deformation caused by crimping remains permanent therein, and therefore desirably have as low compression set as possible for showing excellent sealing characteristics. In conventional fluororubber compositions, cross-linking density is increased by an increase in an amount of cross-linking agents, which reduces compression set of the sealing materials. In this case, however, the sealing materials are highly compressed, which deteriorates crack resistance thereof. Conversely, cross-linking density is reduced by a decrease in an amount of cross-linking agents, which improves crack resistance of the sealing materials. In this case, however, the compression set of the sealing materials is increased. Therefore, adjustment of the amount of cross-linking agents can not satisfy both compression set resistance and crack resistance.

In order to solve such problems, Patent Document 1 discloses a rubber composition in which a compounding ratio of various additives to be added to fluororubber is defined. However, such a rubber composition cannot sufficiently satisfy compression set resistance and crack resistance at the same time.

Further, Patent Document 2 suggests a sealing material comprising a composition including a fluoroelastomer. The fluoroelastomer is a copolymer of monomer components including vinylidenefluoride, tetrafluoroethylene, and hexafluoropropylene and has an average molecular weight of 400,000 to 700,000. However, there has been a problem that compression set resistance of the sealing material is insufficient, and in view of the processability of a fluororubber or a fluororubber composition, flowability is too poor to measure Mooney viscosity, and therefore the fluororubber and the fluororubber composition are not substantially processable. Further, Patent Document 3 suggests a rubber composition comprising a fluororubber and a cross-linking agent, and having a Mooney viscosity ($ML_{1+20}$, 140° C.) of 70 to 150. Patent Document 4 suggests a cross-linked and formed product containing a fluororubber and a thermal black. However, the compression set resistance of the sealing materials is still insufficient, and there is room for improvement in crack resistance.

Further, sensor control with high accuracy has been needed as performance of engines and devices is improved, and environmental conservation awareness is improved. The oxygen sensors for vehicles these days are mounted on the upstream region of an exhaust gas flow whose temperature is higher in the upstream.

Further, downsizing of engines has been needed for creating a large residence space of vehicles along with the density growth of engine rooms. The development of downsized engines has been highly needed because of its contribution to lightening of the weight of vehicles and lowering of fuel consumption. However, the downsized engines cause elevation of the temperature inside the engine room. Some oxygen sensors may be placed at such a portion with high temperatures.

Thus, the crack resistance and the compression set resistance under high compression tend to be lowered at elevated temperatures. Therefore, fluororubbers used for sealing materials have been needed not to impair such characteristics under high temperature use conditions compared with conventional use conditions.

Patent Document 1: JP 9-188793 A
Patent Document 2: WO 2003/074625
Patent Document 3: WO 2006/040944
Patent Document 4: JP 2001-192482

SUMMARY OF THE INVENTION

Problems to be Solved by the Invention

Although fluororubber is excellent in heat-aging resistance, chemical resistance, and oil resistance, it is insufficient in crack resistance at high temperatures and high compression conditions. Thus, fluororubber sealing materials used at high temperatures and high compression are expected to have improved durability.

An object of the present invention is to provide a sealing material which is excellent in sealability under high-temperature conditions as well as crack resistance at high temperatures and high compression.

Means for Solving the Problems

The present inventors have performed diligent studies and focused on the loss modulus (E"). They have found that a fluororubber sealing material having a specific loss modulus is excellent in crack resistance at high temperatures and high compression. Thereby, they have completed the present invention.

In other words, the present invention relates to a sealing material comprising: a cross-linked fluororubber layer obtainable by cross-linking a fluororubber composition containing a fluororubber (A) and a carbon black (B), the cross-linked fluororubber layer having a loss modulus E" of 600 kPa or higher and 6,000 kPa or lower determined by a dynamic viscoelasticity test under conditions of measurement temperature: 160° C., tensile strain: 1%, initial force: 157 cN, and frequency: 10 Hz.

Further, the cross-linked fluororubber layer preferably has a storage modulus E' of 1,500 kPa or higher and 20,000 kPa or lower determined by a dynamic viscoelasticity test under conditions of measurement temperature: 160° C., tensile strain: 1%, initial force: 157 cN, and frequency: 10 Hz.

The carbon black (B) which gives a loss modulus E" in the above range and further preferably a storage modulus E' in the above range to the cross-linked fluororubber layer is preferably a carbon black having a nitrogen adsorption specific surface area ($N_2SA$) of 20 to 180 m²/g and a dibutyl phthalate (DBP) oil absorption of 50 to 180 ml/100 g. This is because such a carbon black forms a carbon gel network reinforcing structure with fluororubber and thereby improves crack resistance at high temperatures and high compression.

Preferable examples of the fluororubber (A) include: vinylidene fluoride copolymer rubber; tetrafluoroethylene/perfluoro (alkyl vinyl ether) copolymer rubber, and tetrafluoroethylene/propylene copolymer rubber because of their excellent heat resistance and compression set resistance.

The fluororubber composition may further contain a cross-linking agent (C) and/or a cross-linking aid (D).

The sealing material of the present invention may be suitably used as a sealing material for a sensor which is in particular required to have excellent crack resistance at high temperatures and high compression.

Effect of the Invention

The present invention provides a sealing material which is excellent in sealability under high-temperature conditions as well as crack resistance at high temperatures and high compression.

MODES FOR CARRYING OUT THE INVENTION

The present invention relates to a sealing material comprising: a cross-linked fluororubber layer obtainable by cross-linking a fluororubber composition containing a fluororubber (A) and a carbon black (B), the cross-linked fluororubber layer having a loss modulus E" of 600 kPa or higher and 6,000 kPa or lower determined by a dynamic viscoelasticity test under conditions of measurement mode: tensile, chuck distance: 20 mm, measurement temperature: 160° C., tensile strain: 1%, initial force: 157 cN, and frequency: 10 Hz.

Respective requirements will be described hereinbelow.

The fluororubber (A) in the present invention preferably has a structural unit derived from at least one monomer selected from tetrafluoroethylene (TFE), vinylidene fluoride (VdF), and perfluoroethylenic unsaturated compounds (e.g. hexafluoropropylene (HFP) and perfluoro(alkyl vinyl ether) (PAVE)) represented by formula (1):

$$CF_2=CF-R_f^a \quad (1)$$

wherein $R_f^a$ is $-CF_3$ or $-OR_f^b$ ($R_f^b$ is a C1-C5 perfluoroalkyl group).

In another aspect, the fluororubber (A) is preferably a non-perfluoro fluororubber or a perfluoro fluororubber.

Examples of the non-perfluoro fluororubber include: vinylidene fluoride (VdF) fluororubber; tetrafluoroethylene (TFE)/propylene (Pr) fluororubber; tetrafluoroethylene (TFE)/propylene (Pr)/vinylidene fluoride (VdF) fluororubber; ethylene (Et)/hexafluoropropylene (HFP) fluororubber; ethylene (Et)/hexafluoropropylene (HFP)/vinylidene fluoride (VdF) fluororubber; ethylene (Et)/hexafluoropropylene (HFP)/tetrafluoroethylene (TFE) fluororubber; fluorosilicone fluororubber; and fluorophosphazene fluororubber. Each of these may be used alone, or any of these may be used in combination to the extent that they do not deteriorate the effects of the present invention. More suitable among these is at least one selected from the group consisting of VdF fluororubber, TFE/Pr rubber, and TFE/Pr/VdF rubber because of their good heat resistance and compression set resistance.

The VdF rubber preferably has 20 mol % or more and 90 mol % or less, and more preferably 40 mol % or more and 85 mol % or less, of a VdF repeating unit in the total moles of the VdF repeating unit and repeating units derived from other comonomers. The lower limit thereof is further preferably 45 mol % and particularly preferably 50 mol %, while the upper limit thereof is further preferably 80 mol %.

The comonomers in the VdF rubber are not particularly limited as long as they are copolymerizable with VdF. Examples thereof include fluoromonomers such as TFE, HFP, PAVE, chlorotrifluoroethylene (CTFE), trifluoroethylene, trifluoropropylene, tetrafluoropropylene, pentafluoropropylene, trifluorobutene, tetrafluoroisobutene, hexafluoroisobutene, vinyl fluoride, iodine-containing fluorinated vinyl ether, and a fluorine-containing monomer (2) represented by formula (2):

$$CH_2=CFR_f \quad (2)$$

wherein $R_f$ is a C1-C12 linear or branched fluoroalkyl group; fluorine-free monomers such as ethylene (Et), propylene (Pr), and alkyl vinyl ethers; monomers giving a cross-linkable group (a curing site); and a reactive emulsifier. Each of these monomers and compounds may be used alone, or two or more of these may be used in combination.

The PAVE is more preferably perfluoro(methyl vinyl ether) (PMVE) or perfluoro(propyl vinyl ether) (PPVE), and is particularly preferably PMVE.

The PAVE may be a perfluorovinyl ether represented by the formula:

$$CF_2=CFOCF_2OR_f^c$$

wherein $R_f^c$ is a C1-C6 linear or branched perfluoroalkyl group, a C5-C6 cyclic perfluoroalkyl group, or a C2-C6 linear or branched perfluorooxyalkyl group having 1 to 3 oxygen atoms. The PAVE is preferably $CF_2=CFOCF_2OCF_3$, $CF_2=CFOCF_2OCF_2CF_3$, or $CF_2=CFOCF_2OCF_2CF_2OCF_3$.

The fluorine-containing monomer (2) of formula (2) is preferably a monomer whose $R_f$ is a linear fluoroalkyl group, and more preferably a monomer whose $R_f$ is a linear perfluoroalkyl group. The carbon number of $R_f$ is preferably 1 to 6. Examples of the fluorine-containing monomer (2) of formula (2) include $CH_2=CFCF_3$, $CH_2=CFCF_2CF_3$, $CH_2=CFCF_2CF_2CF_3$, and $CH_2=CFCF_2CF_2CF_2CF_3$. Preferable among these is 2,3,3,3-tetrafluoropropylene represented as $CH_2=CFCF_3$.

The VdF rubber is preferably at least one copolymer selected from the group consisting of a VdF/HFP copolymer, VdF/TFE/HFP copolymer, VdF/CTFE copolymer, VdF/CTFE/TFE copolymer, VdF/PAVE copolymer, VdF/TFE/PAVE copolymer, VdF/HFP/PAVE copolymer, VdF/HFP/TFE/PAVE copolymer, VdF/TFE/propylene (Pr) copolymer, VdF/ethylene (Et)/HFP copolymer, and copolymer of VdF/fluorine-containing monomer (2) of formula (2). Further, the rubber is more preferably one having TFE, HFP, and/or PAVE as comonomers other than VdF. Preferable among these is at least one copolymer selected from the group consisting of a VdF/HFP copolymer, VdF/TFE/HFP copolymer, copolymer of VdF/fluorine-containing monomer (2) of formula (2), VdF/PAVE copolymer, VdF/TFE/PAVE copolymer, VdF/HFP/PAVE copolymer, and VdF/HFP/TFE/PAVE copolymer. More preferable among these is at least one copolymer selected from the group consisting of a VdF/HFP copolymer, VdF/HFP/TFE copolymer, copolymer of VdF/fluorine-containing monomer (2) of formula (2), and VdF/PAVE copolymer. Particularly preferable among these is at least one copolymer selected from the group consisting of a VdF/HFP copolymer, copolymer of VdF/fluorine-containing monomer (2) of formula (2), and VdF/PAVE copolymer.

In the VdF/HFP copolymer, the composition of VdF/HFP is preferably (45 to 85)/(55 to 15) (mol %), more preferably (50 to 80)/(50 to 20) (mol %), and further preferably (60 to 80)/(40 to 20) (mol %).

In the VdF/TFE/HFP copolymer, the composition of VdF/TFE/HFP is preferably (30 to 80)/(4 to 35)/(10 to 35) (mol %).

In the VdF/PAVE copolymer, the composition of VdF/PAVE is preferably (65 to 90)/(35 to 10) (mol %).

In the VdF/TFE/PAVE copolymer, the composition of VdF/TFE/PAVE is preferably (40 to 80)/(3 to 40)/(15 to 35) (mol %).

In the VdF/HFP/PAVE copolymer, the composition of VdF/HFP/PAVE is preferably (65 to 90)/(3 to 25)/(3 to 25) (mol %).

In the VdF/HFP/TFE/PAVE copolymer, the composition of VdF/HFP/TFE/PAVE is preferably (40 to 90)/(0 to 25)/(0 to 40)/(3 to 35) (mol %), and more preferably (40 to 80)/(3 to 25)/(3 to 40)/(3 to 25) (mol %).

In the copolymer based on VdF/fluorine-containing monomer (2) of formula (2), the mol % ratio of VdF/fluorine-containing monomer (2) units is preferably 85/15 to 20/80 and the amount of monomer units other than the VdF and fluorine-containing monomer (2) units is preferably 0 to 50 mol % in all of the monomer units; the mol % ratio of the VdF/fluorine-containing monomer (2) units is more preferably 80/20 to 20/80. The mol % ratio of the VdF/fluorine-containing monomer (2) units is also preferably 85/15 to 50/50, and the amount of monomer units other than the VdF and fluorine-containing monomer (2) units is also preferably 1 to 50 mol % in all of the monomer units. The monomers other than the VdF and fluorine-containing monomer (2) units are preferably the monomers listed above as the comonomers for VdF, that is, TFE, HFP, PMVE, perfluoroethyl vinyl ether (PEVE), PPVE, CTFE, trifluoroethylene, hexafluoroisobutene, vinyl fluoride, ethylene (Et), propylene (Pr), alkyl vinyl ether, monomers giving a cross-linkable group, and a reactive emulsifier. Preferable among these are PMVE, CTFE, HFP, and TFE.

The TFE/propylene (Pr) fluororubber is a fluorine-containing copolymer containing 45 to 70 mol % of TFE and 55 to 30 mol % of propylene (Pr). In addition to these two components, the rubber may further contain 0 to 40 mol % of a specific third component (e.g. PAVE).

In the ethylene (Et)/HFP fluororubber (copolymer), the composition of Et/HFP is preferably (35 to 80)/(65 to 20) (mol %), and more preferably (40 to 75)/(60 to 25) (mol %).

In the Et/HFP/TFE fluororubber (copolymer), the composition of Et/HFP/TFE is preferably (35 to 75)/(25 to 50)/(0 to 15) (mol %), and more preferably (45 to 75)/(25 to 45)/(0 to 10) (mol %).

Examples of the perfluoro fluororubber include those including TFE/PAVE. The composition of TFE/PAVE is preferably (50 to 90)/(50 to 10) (mol %), more preferably (50 to 80)/(50 to 20) (mol %), and further preferably (55 to 75)/(45 to 25) (mol %).

Examples of the PAVE in this case include PMVE and PPVE. Each of these may be used alone, or any of these may be used in combination.

The fluororubber preferably has a number average molecular weight of 5,000 to 500,000, more preferably 10,000 to 500,000, and particularly preferably 20,000 to 500,000.

From the viewpoint of processability, the fluororubber (A) preferably has a Mooney viscosity at 100° C. of within a range of 20 to 200, and further preferably 30 to 180. The Mooney viscosity is measured in accordance with ASTM-D1646 and JIS K 6300.

The above-described non-perfluoro fluororubber and perfluoro fluororubber may be produced by a common method such as emulsion polymerization, suspension polymerization, or solution polymerization. In particular, a polymerization method using an iodine (bromine) compound, which is known as iodine (bromine) transfer polymerization, can provide a fluororubber having a narrow molecular weight distribution.

In order to provide a fluororubber composition having a low viscosity, for example, other species of fluororubbers may be blended with the fluororubber (A). Examples of other fluororubbers include low molecular weight liquid fluororubber (number average molecular weight: 1,000 or more), low molecular weight fluororubber having a number average molecular weight of about 10,000, and fluororubber having a number average molecular weight of about 100,000 to about 200,000.

The listed monomers in the above non-perfluoro fluororubber and perfluoro fluororubber are examples of the main monomers of the rubber, and the main monomers may be suitably copolymerized with monomers giving a cross-linkable group. The monomer giving a cross-linkable group may be any monomer which can provide a suitable cross-linkable group depending on a production method and cross-link system. Examples thereof include known polymerizable compounds and chain transfer agents having an iodine atom, bromine atom, carbon-carbon double bond, cyano group, carboxyl group, hydroxyl group, amino group, ester group, and the like.

Examples of the monomer giving a preferable cross-linkable group include a compound represented by formula (3):

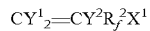   (3)

wherein $Y^1$ and $Y^2$ each are a fluorine atom, hydrogen atom, or —$CH_3$; $R_f^2$ is a linear or branched fluoroalkylene group which may have one or more ethereal oxygen atoms and which may have one or more aromatic rings, and in which part or all of the hydrogen atoms are replaced by fluorine atoms; $X^1$ is an iodine atom or a bromine atom.

Specific examples thereof include: iodine-containing monomers and bromine-containing monomers represented by formula (4):

$$CY^1{}_2=CY^2R_f{}^3CHR^1—X^1 \quad (4)$$

wherein $Y^1$, $Y^2$, and $X^1$ each are the same as defined above; $R_f{}^3$ is a linear or branched fluoroalkylene group which may have one or more ethereal oxygen atoms and in which part or all of the hydrogen atoms are replaced by fluorine atoms, in other words, $R_f{}^3$ is a linear or branched fluorine-containing alkylene group in which part or all of the hydrogen atoms are replaced by fluorine atoms, a linear or branched fluorine-containing oxyalkylene group in which part or all of the hydrogen atoms are replaced by fluorine atoms, or linear or branched fluorine-containing polyoxyalkylene group in which part or all of the hydrogen atoms are replaced by fluorine atoms; $R^1$ is a hydrogen atom or a methyl group; and iodine-containing monomers and bromine-containing monomers represented by formulas (5) to (22):

$$CY^4{}_2=CY^4(CF_2)_n—X^1 \quad (5)$$

wherein $Y^4$s may be the same as or different from each other, and each of these is a hydrogen atom or a fluorine atom; n is an integer of 1 to 8, $$CF_2=CFCF_2R_f{}^4—X^1 \quad (6)$$

wherein $$R_f{}^4 \text{ is } -(-OCF_2-)_n-(-OCF(CF_3)-)_n;$$

n is an integer of 0 to 5;

$$CF_2=CFCF_2(OCF(CF_3)CF_2)_m(OCH_2CF_2CF_2)_nOCH_2CF_2—X^1 \quad (7)$$

wherein m is an integer of 0 to 5; n is an integer of 0 to 5;

$$CF_2=CFCF_2(OCH_2CF_2CF_2)_m(OCF(CF_3)CF_2)_nOCF(CF_3)—X^1 \quad (8)$$

wherein m is an integer of 0 to 5; n is an integer of 0 to 5;

$$CF_2=CF(OCF_2CF(CF_3))_mO(CF_2)_n—X^1 \quad (9)$$

wherein m is an integer of 0 to 5; n is an integer of 1 to 8;

$$CF_2=CF(OCF_2CF(CF_3))_m—X^1 \quad (10)$$

wherein m is an integer of 1 to 5;

$$CF_2=CFOCF_2(CF(CF_3)OCF_2)_nCF(—X^1)CF_3 \quad (11)$$

wherein n is an integer of 1 to 4;

$$CF_2=CFO(CF_2)_nOCF(CF_3)—X^1 \quad (12)$$

wherein n is an integer of 2 to 5;

$$CF_2=CFO(CF_2)_n—(C_6H_4)—X^1 \quad (13)$$

wherein n is an integer of 1 to 6;

$$CF_2=CF(OCF_2CF(CF_3))_nOCF_2CF(CF_3)—X^1 \quad (14)$$

wherein n is an integer of 1 to 2;

$$CH_2=CFCF_2O(CF(CF_3)CF_2O)_nCF(CF_3)—X^1 \quad (15)$$

wherein n is an integer of 0 to 5;

$$CF_2=CFO(CF_2CF(CF_3)O)_m(CF_2)_n—X^1 \quad (16)$$

wherein m is an integer of 0 to 5; n is an integer of 1 to 3;

$$CH_2=CFCF_2OCF(CF_3)OCF(CF_3)—X^1 \quad (17)$$

$$CH_2=CFCF_2OCH_2CF_2—X^1 \quad (18)$$

$$CF_2=CFO(CF_2CF(CF_3)O)_mCF_2CF(CF_3)—X^1 \quad (19)$$

wherein m is an integer of 0 or greater;

$$CF_2=CFOCF(CF_3)CF_2O(CF_2)_n—X^1 \quad (20)$$

wherein n is an integer of 1 or greater;

$$CF_2=CFOCF_2OCF_2CF(CF_3)OCF_2—X^1 \quad (21)$$

$$CH_2=CH—(CF_2)_nX^1 \quad (22)$$

wherein n is an integer of 2 to 8;
in formulas (5) to (22), X' is the same as defined above. Each of these may be used alone, or any of these may be used in combination.

The iodine-containing monomer or the bromine-containing monomer represented by formula (4) is preferably an iodine-containing fluorinated vinyl ether represented by formula (23):

$$I(CH_2CF_2CF_2O)_m(\underset{\underset{CF_3}{|}}{C}FCF_2O)_nCF=CF_2 \quad (23)$$

wherein m is an integer of 1 to 5; n is an integer of 0 to 3. More specific examples thereof include those represented as follows.

$$ICH_2CF_2CF_2OCF=CF_2, \quad I(CH_2CF_2CF_2O)_2CF=CF_2,$$

$$I(CH_2CF_2CF_2O)_3CF=CF_2, \quad ICH_2CF_2CF_2O\underset{\underset{CF_3}{|}}{C}FCF_2OCF=CF_2,$$

$$ICH_2CF_2CF_2O(\underset{\underset{CF_3}{|}}{C}FCF_2O)_2CF=CF_2$$

Preferable among these is $ICH_2CF_2CF_2OCF=CF_2$.

More specifically, preferable examples of the iodine-containing monomer and the bromine-containing monomer represented by formula (5) include $ICF_2CF_2CF=CH_2$ and $I(CF_2CF_2)_2CF=CH_2$.

More specifically, preferable examples of the iodine-containing monomer and the bromine-containing monomer represented by formula (9) include $I(CF_2CF_2)_2OCF=CF_2$.

More specifically, preferable examples of the iodine-containing monomer and the bromine-containing monomer represented by formula (22) include $CH_2=CHCF_2CF_2I$ and $I(CF_2CF_2)_2CH=CH_2$.

Further, a bisolefin compound represented by formula:

$$R^2R^3C=CR^4—Z—CR^5=CR^6R^7$$

wherein $R^2$, $R^3$, $R^4$, $R^5$, $R^6$, and $R^7$ may be the same as or different from each other, and each of these is H or a C1-C5 alkyl group; Z is a C1-C18 linear or branched alkylene group or cycloalkylene group which may have an oxygen atom and which is preferably at least partially fluorinated, or a (per)fluoropolyoxyalkylene group, is also preferable as a monomer giving a cross-linkable group. The term "(per)fluoropolyoxyalkylene group" herein means a fluoropolyoxyalkylene group or a perfluoropolyoxyalkylene group.

Z is preferably a C4-C12 (per)fluoroalkylene group; $R^2$, $R^3$, $R^4$, $R^5$, $R^6$, and $R^7$ each are preferably a hydrogen atom.

In the case that Z is a (per)fluoropolyoxyalkylene group, it is preferably a (per)fluoropolyoxyalkylene group represented by formula:

$$-(Q)_p-CF_2O—(CF_2CF_2O)_m—(CF_2O)_n—CF_2-(Q)_p-$$

wherein Q is a C1-C10 alkylene group or a C2-C10 oxyalkylene group; p is 0 or 1; m and n are integers which give an m/n ratio of 0.2 to 5 and a molecular weight of the (per) fluoropolyoxyalkylene group of 500 to 10,000, preferably 1,000 to 4,000. In this formula, Q is preferably selected from —CH$_2$OCH$_2$— and —CH$_2$O(CH$_2$CH$_2$O)$_s$CH$_2$— wherein s=1 to 3.

Preferable examples of the bisolefin include CH$_2$=CH—(CF$_2$)$_4$—CH=CH$_2$, CH$_2$=CH—(CF$_2$)$_6$—CH=CH$_2$, and those represented by formula:

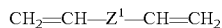

wherein $Z^1$ is —CH$_2$OCH$_2$—CF$_2$O—(CF$_2$CF$_2$O)$_m$—(CF$_2$O)$_n$—CF$_2$—CH$_2$OCH$_2$—, wherein m/n is 0.5.

Preferable among these is 3,3,4,4,5,5,6,6,7,7,8,8-dodecafluoro-1,9-decadiene represented as CH$_2$=CH—(CF$_2$)$_6$—CH=CH$_2$.

In the present invention, the carbon black (B) is not particularly limited as long as it is a carbon black providing the loss modulus E″ in the above range and further preferably the storage modulus E′ in the above range.

Examples of such a carbon black include furnace black, acetylene black, thermal black, channel black, and graphite. Specific examples thereof include SAF-HS (N$_2$SA: 142 m$^2$/g, DBP: 130 ml/100 g), SAF (N$_2$SA: 142 m$^2$/g, DBP: 115 ml/100 g), N234 (N$_2$SA: 126 m$^2$/g, DBP: 125 ml/100 g), ISAF (N$_2$SA: 119 m$^2$/g, DBP: 114 ml/100 g), ISAF-LS (N$_2$SA: 106 m$^2$/g, DBP: 75 ml/100 g), ISAF-HS (N$_2$SA: 99 m$^2$/g, DBP: 129 ml/100 g), N339 (N$_2$SA: 93 m$^2$/g, DBP: 119 ml/100 g), HAF-LS (N$_2$SA: 84 m$^2$/g, DBP: 75 ml/100 g), HAF-HS (N$_2$SA: 82 m$^2$/g, DBP: 126 ml/100 g), HAF (N$_2$SA: 79 m$^2$/g, DBP: 101 ml/100 g), N351 (N$_2$SA: 74 m$^2$/g, DBP: 127 ml/100 g), LI-HAF (N$_2$SA: 74 m$^2$/g, DBP: 101 ml/100 g), MAF-HS (N$_2$SA: 56 m$^2$/g, DBP: 158 ml/100 g), MAF (N$_2$SA: 49 m$^2$/g, DBP: 133 ml/100 g), FEF-HS (N$_2$SA: 42 m$^2$/g, DBP: 160 ml/100 g), FEF (N$_2$SA: 42 m$^2$/g, DBP: 115 ml/100 g), SRF-HS (N$_2$SA: 32 m$^2$/g, DBP: 140 ml/100 g), SRF-HS (N$_2$SA: 29 m$^2$/g, DBP: 152 ml/100 g), GPF (N$_2$SA: 27 m$^2$/g, DBP: 87 ml/100 g), SRF (N$_2$SA: 27 m$^2$/g, DBP: 68 ml/100 g), and SRF-LS (N$_2$SA: 23 m$^2$/g, DBP: 51 ml/100 g). Each of these carbon blacks may be used alone, or two or more of these may be used in combination.

For instance, when thermal black such as the MT carbon or the FT carbon is used alone, it is difficult to satisfy the loss modulus E″ within the above range. Therefore, when thermal black is used, thermal black is used together with carbon black other than a thermal black.

Particularly preferable as the carbon black is a carbon black having a nitrogen adsorption specific surface area (N$_2$SA) of 20 to 180 m$^2$/g and a dibutyl phthalate (DBP) oil absorption of 50 to 180 ml/100 g.

If the nitrogen adsorption specific surface area (N$_2$SA) is smaller than 20 m$^2$/g, the crack resistance of rubber at high temperatures and high compression tends to be poor in the case that the carbon black is mixed into the rubber. From this viewpoint, the nitrogen adsorption specific surface area (N$_2$SA) is preferably 20 m$^2$/g or larger, more preferably 25 m$^2$/g or larger, further preferably 40 m$^2$/g or larger, and particularly preferably 50 m$^2$/g or larger. The upper limit thereof is preferably 180 m$^2$/g because of easy availability in general.

If the dibutyl phthalate (DBP) oil absorption is smaller than 50 ml/100 g, the crack resistance of rubber at high temperatures and high compression tends to be poor in the case that the carbon black is mixed into the rubber. From this viewpoint, the DBP oil absorption is preferably 55 ml/100 g or higher, further preferably 60 ml/100 g or higher, and particularly preferably 70 ml/100 g. The upper limit thereof is preferably 175 ml/100 g, and further preferably 170 ml/100 g because of easy availability in general.

The amount of the carbon black (B) is preferably 5 to 50 parts by mass to 100 parts by mass of the fluororubber (A). Too large an amount of the carbon black (B) tends to cause poor crack resistance of a cross-linked product at high temperatures and high compression. In contrast, too small an amount of the carbon black (B) tends to cause poor crack resistances at high temperatures and high compression. For good balance of physical properties, the amount thereof is preferably 6 parts by mass or more, and more preferably 10 parts by mass or more, to 100 parts by mass of the fluororubber (A). For good balance of physical properties, the amount there of is preferably 49 parts by mass or less and, in particular, more preferably 45 parts by mass or less.

In order to obtain the cross-linked fluororubber layer of the present invention, a fluororubber composition is suitably used that has a difference δG' (G'(1%)–G'(100%)) between the shear modulus G'(1%) at 1% dynamic strain and the shear modulus G'(100%) at 100% dynamic strain of 150 kPa or higher and 3,000 kPa or lower determined by a dynamic viscoelasticity test (measurement temperature: 100° C., measurement frequency: 1 Hz) with a rubber process analyzer (RPA) before cross-linking.

The difference δG' is used as a standard for evaluating the property of reinforcement of the rubber composition, and it is determined by a dynamic viscoelasticity test with a rubber process analyzer.

The fluororubber composition having a difference δG' in the range of 150 kPa or higher and 3,000 kPa or lower is advantageous for crack resistance under high temperature and high compression, and the like.

The difference δG' is preferably 180 kPa or higher, and further preferably 200 kPa or higher, for crack resistance at high temperatures and high compression, and the like. In contrast, it is preferably 2,800 kPa or lower, and further preferably 2,500 kPa or lower, for crack resistance at high temperatures and high compression, and the like.

The fluororubber composition having a difference δG' of 150 kPa or higher and 3,000 kPa or lower may be prepared using a mixer or a roll mixer, for example.

More specifically, the following methods may be adopted; the method is not limited to these methods.

(1) A method in which predetermined amounts of a fluororubber (A) and a carbon black (B), and if necessary the below-mentioned organic amine compound and/or acid acceptor, are charged into an internal mixer, and then mixed at an average shear rate of a rotor of 50 to 1,000 (1/second), preferably 100 to 1,000 (1/second), and further preferably 200 to 1,000 (1/second) so that the highest mixing temperature Tm is 80° C. to 220° C. (preferably 120° C. to 200° C.) (in other words, mixing is preferably carried out under the condition that a mixed product has a highest temperature Tm of 80° C. to 220° C. while being mixed and being discharged. The same applies below). Examples of the internal mixer include a pressurizing kneader, Banbury mixer, single screw mixer, and twin screw mixer.

(2) A method in which predetermined amounts of a fluororubber (A) and a carbon black (B), and if necessary the below-mentioned organic amine compound and/or acid acceptor, are charged into a roll mixer, and then mixed under the conditions that the average shear rate of a rotor is 50 (1/second) or higher and the highest mixing temperature Tm is to be 80° C. to 220° C. (preferably, 120° C. to 200° C.).

The fluororubber compositions obtained by the above methods (1) and (2) are free from components such as a cross-linking agent (and/or a cross-linking aid (D)) and a cross-linking accelerator. Further, the mixing of the methods (1) and (2) may be performed multiple times. In the case of performing the kneading multiple times, the kneading conditions of the second and further subsequent kneading may be the same as those in the methods (1) and (2) except that the highest temperature Tm upon mixing is 140° C. or lower.

One example of the method for preparing a cross-linkable fluororubber composition used in the present invention is a method in which the fluororubber composition obtained in the method (1) or (2), or obtained by repeating the method (1) or (2) multiple times, is further blend-mixed with a cross-linking agent (C) (and/or a cross-linking aid (D)) and a cross-linking accelerator.

The cross-linking agent (C) (and/or the cross-linking aid (D)) and the cross-linking accelerator may be blend-mixed at the same time, or the cross-linking accelerator may be first blend-mixed and then the cross-linking agent (C) (and/or the cross-linking aid (D)) may be blend-mixed. The conditions for mixing the cross-linking agent (C) (and/or the cross-linking aid (D)) and the cross-linking accelerator may be the same as those in the methods (1) and (2) except that the highest mixing temperature Tm is 130° C. or lower.

Another example of the method for preparing a cross-linkable fluororubber composition is a method in which predetermined amounts of a fluororubber (A), carbon black (B), cross-linking agent (C) (and/or cross-linking aid (D)), and cross-linking accelerator are charged into a roll mixer in an appropriate order, and then mixed under the conditions that the average shear rate of a rotor is 50 (1/second) or higher and the highest mixing temperature Tm is 130° C. or lower.

In the case of the polyol cross-link system, the fluororubber (A), the cross-linking agent (C), and a cross-linking accelerator may be preliminarily mixed to prepare a uniform dispersion, and this uniform dispersion may be used. For example, the fluororubber (A), a polyol cross-linking agent, and a cross-linking accelerator are first mixed, and then a carbon black and the below-mentioned organic amine compound are mixed thereinto. The mixture is mixed at the highest temperature Tm upon mixing of 80 to 220° C. Finally, an acid acceptor is mixed therewith at the highest temperature Tm upon mixing is 130° C. or lower. Upon mixing, a more preferable is one in which mixing is performed at an average shear rate of 50 (1/second) or higher.

The range of the difference δG' is preferably satisfied in the fluororubber composition before mixed with a cross-linking agent (C) and/or a cross-linking aid (D), and a cross-linking accelerator. Further, the difference δG' is also preferably within the above range even in the fluororubber composition containing a cross-linking agent (C) and/or a cross-linking aid (D), and a cross-linking accelerator.

In order to obtain a fluororubber layer having the aforementioned specific loss modulus E" and storage modulus E', the average shear rate is preferably 50 (1/second) or higher. An average shear rate of 50 (1/second) or higher provides excellent crack resistance at high temperatures and high compression.

The average shear rate (1/second) is calculated by the following formula.

Average shear rate(1/second)=$(p \times D \times R)/(60 \text{ (seconds)} \times c)$ wherein
D: rotor diameter or roll diameter (cm)
R: rotation rate (rpm)
c: tip clearance (cm, gap distance between rotor and casing or gap distance between rolls)

The cross-linking agent (C) and/or the cross-linking aid (D), and the cross-linking accelerator may be appropriately selected depending on the cross-link system, the type of the fluororubber (A) to be cross-linked (e.g. composition of copolymerization, presence of a cross-linkable group and the type thereof), the specific applications and the modes of a sealing material to be used, the mixing conditions, and the like.

In the present invention, the cross-linking aid (D) is a compound which initiates a cross-linking reaction in a triazine cross-link system mentioned below, or a compound which accelerates a cross-linking reaction in an oxazole cross-link system, a thiazole cross-link system, or an imidazole cross-link system.

Examples of the cross-link system include a peroxide cross-link system, polyol cross-link system, polyamine cross-link system, oxazole cross-link system, thiazole cross-link system, imidazole cross-link system, and triazine cross-link system.

(Peroxide Cross-Link System)

In the case that cross-linking is performed by the peroxide cross-link system, the cross-linking site has a carbon-carbon bond; thus, the system is superior in chemical resistance and steam resistance compared with the polyol cross-link system in which the cross-linking site has a carbon-oxygen bond and the polyamine cross-link system in which the cross-linking site has a carbon-nitrogen double bond.

The cross-linking agent of the peroxide cross-link system may be any peroxide capable of easily generating a peroxy radical in the presence of heat or a redox system. Specific examples thereof include organic peroxides such as 1,1-bis(t-butylperoxy)-3,5,5-trimethylcyclohexane, 2,5-dimethylhexane-2,5-dihydroperoxide, di-t-butyl peroxide, t-butylcumyl peroxide, dicumyl peroxide, α,α-bis(t-butylperoxy)-p-diisopropylbenzene, α,α-bis(t-butylperoxy)-m-diisopropylbenzene, α,α-bis(t-butylperoxy)-m-diisopropylbenzene, 2,5-dimethyl-2,5-di(t-butylperoxy)hexane, 2,5-dimethyl-2,5-di(t-butylperoxy)-hexyne-3, benzoyl peroxide, t-butylperoxybenzene, t-butylperoxybenzoate, t-butylperoxy maleic acid, and t-butylperoxyisopropyl carbonate. Preferable among these is 2,5-dimethyl-2,5-di(t-butylperoxy)hexane or 2,5-dimethyl-2,5-di(t-butylperoxy)-hexyne-3.

Further, in the peroxide cross-link system, it is preferable to use a cross-linking accelerator, in general. Examples of the cross-linking accelerator for peroxide cross-linking agents, especially organoperoxide cross-linking agents, include triallyl cyanurate, triallyl isocyanurate (TRIC), triacryl formal, triallyl trimellitate, N,N'-m-phenylene bismaleimide, dipropargyl terephthalate, diallyl phthalate, tetraallyl terephthalate amide, triallyl phosphate, bismaleimide, fluorinated triallyl isocyanurate (1,3,5-tris(2,3,3-trifluoro-2-propenyl)-1,3,5-triazine-2,4,6-trione), tris(diallylamine)-S-triazine, triallyl phosphite, N,N-diallylacrylamide, 1,6-divinyldodecafluorohexane, hexaallyl phosphoramide, N,N,N',N'-tetraallyl phthalamide, N,N,N',N'-tetraallyl malonamide, trivinyl isocyanurate, 2,4,6-trivinyl methyltrisiloxane, tri(5-norbornene-2-methylene)cyanurate, and triallyl phosphite. Preferable among these is triallyl isocyanurate (TRIC) from the viewpoints of its cross-linkability and physical properties of cross-linked products.

A perfluoro fluororubber and a non-perfluoro fluororubber having at least a TFE unit, a VdF unit, or a fluorine-containing monomer unit of formula (1) may be suitably used as the fluororubber (A) for the peroxide cross-link system. Particularly preferable is at least one rubber selected from VdF rubbers and TFE/Pr rubbers.

From the viewpoint of cross-linkability, the fluororubber (A) suitable for the peroxide cross-link system is preferably a fluororubber having an iodine atom and/or a bromine atom as a cross-linking site. For good balance of physical properties, the amount of an iodine atom and/or a bromine atom is preferably 0.001 to 10% by mass, further preferably 0.01 to 5% by mass, and particularly preferably 0.1 to 3% by mass.

The amount of the peroxide cross-linking agent is preferably 0.01 to 10 parts by mass, more preferably 0.1 to 9 parts by mass, and particularly preferably 0.2 to 8 parts by mass, to 100 parts by mass of the fluororubber (A). If the amount of the peroxide cross-linking agent is less than 0.01 parts by mass, cross-linking of the fluororubber (A) tends to insufficiently proceed. In contrast, if the amount thereof is more than 10 parts by mass, balance of physical properties tends to be poor.

Further, the amount of the cross-linking accelerator is generally 0.01 to 10 parts by mass, and preferably 0.1 to 9 parts by mass, relative to 100 parts by mass of the fluororubber (A). If the amount of the cross-linking accelerator is less than 0.01 parts by mass, cross-linking tends to take too long a time which may be impractical. In contrast, if the amount thereof is more than 10 parts by mass, cross-linking tends to proceed too rapidly, as well as cause poor balance of physical properties.

(Polyol Cross-Link System)

In the case of cross-linking by the polyol cross-link system, the cross-linking site has a carbon-oxygen bond, compression set is low, and formability is excellent. Therefore, this cross-link system is preferable.

A polyol cross-linking agent is preferred as the cross-linking agent (C). The polyol cross-linking agent may be a compound conventionally known as a cross-linking agent for fluororubber. Suitably used is a polyhydroxy compound, especially a polyhydroxyaromatic compound, for example, because of its excellent heat resistance.

The polyhydroxyaromatic compound is not particularly limited. Examples thereof include 2,2-bis(4-hydroxyphenyl) propane (hereinafter referred to as bisphenol A), 2,2-bis(4-hydroxyphenyl)perfluoropropane (hereinafter referred to as bisphenol AF), resorcin, 1,3-dihydroxybenzene, 1,7-dihydroxynaphthalene, 2,7-dihydroxynaphthalene, 1,6-dihydroxynaphthalene, 4,4'-dihydroxydiphenyl, 4,4'-dihydroxystilbene, 2,6-dihydroxyanthracene, hydroquinone, catechol, 2,2-bis(4-hydroxyphenyl)butane (hereinafter referred to as bisphenol B), 4,4-bis(4-hydroxyphenyl)valerate, 2,2-bis(4-hydroxyphenyl)tetrafluorodichloropropane, 4,4'-dihydroxydiphenylsulfone, 4,4'-dihydroxydiphenylketone, tri(4-hydroxyphenyl)methane, 3,3',5,5'-tetrachlorobisphenol A, and 3,3',5,5'-tetrabromobisphenol A. These polyhydroxyaromatic compounds may be alkaline metal salts or alkaline earth metal salts; in the case of coagulating copolymers using an acid, it is preferable not to use the metal salts.

Of these compounds, polyhydroxy compounds are preferable because of a low compression set of a formed product to be obtained and excellent formability; polyhydroxyaromatic compounds are more preferable because of excellent heat resistance; and bisphenol AF is further preferable.

Further, in the polyol cross-link system, it is preferable to use a cross-linking accelerator, in general. A cross-linking accelerator accelerates generation of double bonds in molecules in defluorination reaction of the main chain of the fluororubber and addition of the polyhydroxy compound to the generated double bonds, so that the cross-linking reaction is accelerated.

A generally used cross-linking accelerator for the polyol cross-link system is an onium compound. The onium compound is not particularly limited. Examples thereof include ammonium compounds such as quaternary ammonium salts, phosphonium compounds such as quaternary phosphonium salts, oxonium compounds, sulfonium compounds, cyclic amines, and monofunctional amine compounds. Preferable among these are quaternary ammonium salts and quaternary phosphonium salts.

The quaternary ammonium salts are not particularly limited. Examples thereof include 8-methyl-1,8-diazabicyclo[5,4,0]-7-undecenium chloride, 8-methyl-1,8-diazabicyclo[5,4,0]-7-undecenium iodide, 8-methyl-1,8-diazabicyclo[5,4,0]-7-undecenium hydroxide, 8-methyl-1,8-diazabicyclo[5,4,0]-7-undecenium methylsulfate, 8-ethyl-1,8-diazabicyclo[5,4,0]-7-undecenium bromide, 8-propyl-1,8-diazabicyclo[5,4,0]-7-undecenium bromide, 8-dodecyl-1,8-diazabicyclo[5,4,0]-7-undecenium chloride, 8-dodecyl-1,8-diazabicyclo[5,4,0]-7-undecenium hydroxide, 8-eicosyl-1,8-diazabicyclo[5,4,0]-7-undecenium chloride, 8-tetracosyl-1,8-diazabicyclo[5,4,0]-7-undecenium chloride, 8-benzyl-1,8-diazabicyclo[5,4,0]-7-undecenium chloride (hereinafter referred to as DBU-B), 8-benzyl-1,8-diazabicyclo[5,4,0]-7-undecenium hydroxide, 8-phenethyl-1,8-diazabicyclo[5,4,0]-7-undecenium chloride, and 8-(3-phenylpropyl)-1,8-diazabicyclo[5,4,0]-7-undecenium chloride. Preferable among these is DBU-B because of its cross-linkability and physical properties of a cross-linked product.

The quaternary phosphonium salts are not particularly limited. Examples thereof include tetrabutylphosphonium chloride, benzyltriphenylphosphonium chloride (hereinafter referred to as BTPPC), benzyltrimethylphosphonium chloride, benzyltributylphosphonium chloride, tributylallylphosphonium chloride, tributyl-2-methoxypropylphosphonium chloride, and benzylphenyl(dimethylamino)phosphonium chloride. Preferable among these is benzyltriphenylphosphonium chloride (BTPPC) because of its cross-linkability and physical properties of a cross-linked product.

In addition, a solid solution of a quaternary ammonium salt or a quaternary phosphonium salt and bisphenol AF, or a chlorine-free cross-linking accelerator disclosed in JP 11-147891 A may be used as a cross-linking accelerator.

Any perfluoro fluororubber or non-perfluoro fluororubber having at least a TFE unit, a VdF unit, or a fluorine-containing monomer unit of formula (1) may be suitably used as the fluororubber (A) for the polyol cross-link system. Particularly preferable is at least one rubber selected from VdF rubbers and TFE/Pr rubbers.

The amount of the polyol cross-linking agent is preferably 0.01 to 10 parts by mass, and more preferably 0.1 to 7 parts by mass, relative to 100 parts by mass of the fluororubber (A). If the amount of the polyol cross-linking agent is less than 0.01 parts by mass, the fluororubber (A) tends to be insufficiently cross-linked, while if the amount thereof is more than 10 parts by mass, the balance of physical properties tends to be poor.

The amount of the cross-linking accelerator is preferably 0.01 to 8 parts by mass, and more preferably 0.02 to 5 parts by mass, to 100 parts by mass of the fluororubber (A). If the amount of the cross-linking accelerator is less than 0.01 parts by mass, cross-linking of the fluororubber (A) tends to insufficiently proceed. In contrast, if the amount thereof is more than 8 parts by mass, the balance of physical properties tends to be poor.

(Polyamine Cross-Link System)

In the case of polyamine cross-linking, the cross-linking site has a carbon-nitrogen double bond and dynamic mechanical properties are excellent. However, the compression set tends to be high in comparison with the case of cross-linking using a polyol cross-linking or peroxide cross-linking agent.

Examples of the polyamine cross-linking agent include polyamine compounds such as hexamethylenediamine carbamate, N,N'-dicinnamylidene-1,6-hexamethylenediamine, and 4,4'-bis(aminocyclohexyl)methane carbamate. Preferable among these is N,N'-dicinnamylidene-1,6-hexamethylenediamine.

Any perfluororubber or non-perfluororubber at least having a TFE unit, a VdF unit, or a fluorine-containing monomer unit of formula (1) may be used as the fluororubber (A) suitable for the polyamine cross-link system. In particular, a VdF rubber or a TFE/Pr rubber is preferable.

The amount of the polyamine cross-linking agent is preferably 0.01 to 10 parts by mass, and more preferably 0.2 to 7 parts by mass, to 100 parts by mass of the fluororubber (A). If the amount of the polyamine cross-linking agent is less than 0.01 parts by mass, cross-linking of the fluororubber (A) tends to insufficiently proceed. In contrast, if the amount thereof is more than 10 parts by mass, the balance of physical properties tends to be poor.

(Oxazole Cross-Link System, Thiazole Cross-Link System, and Imidazole Cross-Link System)

The oxazole cross-link system, thiazole cross-link system, and imidazole cross-link system are cross-link systems with a low compression set and excellent heat resistance.

Examples of the cross-linking agent used in the oxazole cross-link system, thiazole cross-link system, and imidazole cross-link system include:

compounds having at least two cross-linkable reaction groups represented by formula (24):

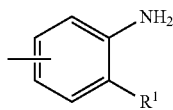

(24)

wherein $R^1$s may be the same as or different from each other and each are $-NH_2$, $-NHR^2$, $-OH$, or $-SH$; $R_2$ is a fluorine atom or a monovalent organic group;

compounds represented by formula (25):

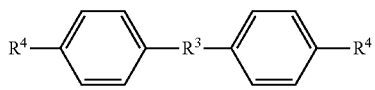

(25)

wherein $R^3$ is $-SO_2-$, $-O-$, $-CO-$, a C1-C6 alkylene group, a C1-C10 perfluoroalkylene group, or a single bond; and

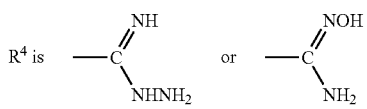

$R^4$ is compounds represented by formula (26):

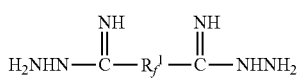

(26)

wherein $R_f^1$ is a C1-C10 perfluoroalkylene group; and compounds represented by formula (27):

(27)

wherein n is an integer of 1 to 10.

Specific examples of the cross-linking agent include:

compounds each of which has two cross-linkable reaction groups represented by formula (24) and each of which is represented by formula (28):

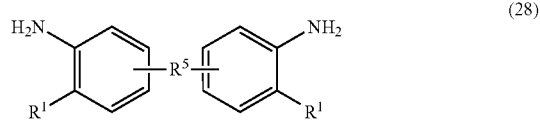

(28)

wherein $R^1$ is as defined above; $R^5$ is $-SO_2-$, $-O-$, $-CO-$, a C1-C6 alkylene group, a C1-C10 perfluoroalkylene group, a single free bond, or a group represented by formula:

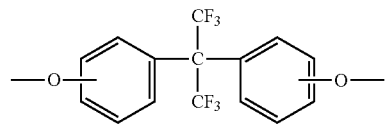

2,2-bis(3-amino-4-hydroxyphenyl)hexafluoropropane, 2,2-bis(3-amino-4-mercaptophenyl)hexafluoropropane, 2,2-bis(3,4-diaminophenyl)hexafluoropropane, and compounds represented by formula (29):

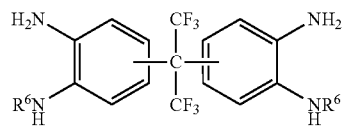

(29)

wherein $R^6$s are the same as or different from each other and each of these is a C1-C10 alkyl group; a C1-C10 alkyl group having a fluorine atom; a phenyl group; a benzyl group; or a phenyl group or a benzyl group in which 1 to 5 hydrogen atoms are replaced by a fluorine atom and/or $-CF_3$.

Non-limitative specific examples thereof include bisaminophenol cross-linking agents such as 2,2-bis(3,4-diaminophenyl)hexafluoropropane, 2,2-bis[3-amino-4-(N-methylamino)phenyl]hexafluoropropane, 2,2-bis[3-amino-4-(N-ethylamino)phenyl]hexafluoropropane, 2,2-bis[3-amino-4-(N-propylamino)phenyl]hexafluoropropane, 2,2-bis[3-amino-4-(N-phenylamino)phenyl]hexafluoropropane, 2,2-bis[3-amino-4-(N-perfluorophenylamino)phenyl]hexafluoropropane, and 2,2-bis[3-amino-4-(N-benzylamino)phenyl]hexafluoropropane.

Further preferable among the above cross-linking agents are 2,2-bis(3-amino-4-hydroxyphenyl)hexafluoropropane (OH-AF), 2,2-bis[3-amino-4-(N-phenylamino)phenyl]hexafluoropropane (Nph-AF), and 2,2-bis(3,4-diaminophenyl)hexafluoropropane (TA-AF) because of excellent heat resistance and particularly good cross-linking reactivity.

In these oxazole cross-link system, thiazole cross-link system, and imidazole cross-link system, a cross-linking aid (D) may be used in combination for greatly increased cross-linking rate.

Examples of the cross-linking aid (D) combination-used in the oxazole cross-link system, thiazole cross-link system, and imidazole cross-link system include (D1) compounds generating ammonia at 40° C. to 330° C. and (D2) particulate inorganic nitride.

(D1) Compounds Generating Ammonia at 40° C. to 330° C. (Ammonia-Generating Compounds)

The ammonia-generating compound (D1) leads to curing as ammonia generated at cross-linking reaction temperature (40° C. to 330° C.) causes cross-linking, and also accelerates curing by a cross-linking agent. There are compounds which react with a slight amount of water to generate ammonia.

Preferable examples of the ammonia-generating compound (D1) include urea or derivatives thereof or ammonium salts. More preferable examples of the ammonia-generating compound (D1) include urea or ammonium salts. The ammonium salt may be an organic ammonium salt or may be an inorganic ammonium salt.

The derivatives of urea includes urea, as well as urea derivatives such as biurea, thiourea, urea hydrochlorides, and biuret.

Examples of the organic ammonium salt include compounds disclosed in JP 9-111081 A, WO 00/09603, and WO 98/23675, such as ammonium salts of polyfluorocarboxylic acids e.g. ammonium perfluorohexanoate and ammonium perfluorooctanoate; ammonium salts of polyfluorosulfonic acids e.g. ammonium perfluorohexanesulfonate and ammonium perfluorooctanesulfonate; ammonium salts of polyfluoroalkyl group-containing phosphoric acids and phosphoric acids e.g. ammonium perfluorohexanephosphate and ammonium perfluorooctanephosphate; and ammonium salts of non-fluorocarboxylic acids and sulfonic acids e.g. ammonium benzoate, ammonium adipate, and ammonium phthalate. Preferable among these are ammonium salts of fluorocarboxylic acids, fluorosulfonic acids, and fluorophosphoric acids from the viewpoint of dispersibility; from the viewpoint of low cost, preferable among these are ammonium salts of non-fluorocarboxylic acids, non-fluorosulfonic acids, and non-fluorophosphoric acids.

Examples of the inorganic ammonium salt include compounds disclosed in JP 9-111081 A, such as ammonium sulfate, ammonium carbonate, ammonium nitrate, and ammonium phosphate. Preferable among these is ammonium phosphate in consideration of cross-linking characteristics.

In addition, acetaldehyde ammonia, hexamethylenetetramine, formamidine, formamidine hydrochloride, formamidine acetate, t-butylcarbamate, benzylcarbamate, $HCF_2CF_2CH(CH_3)OCONH_2$, and phthalamide can be used.

Each of these ammonia-generating compounds (D1) may be used alone, or two or more of these may be used in combination.

(D2) Particulate Inorganic Nitride

The particulate inorganic nitride (D2) is not particularly limited. Examples thereof include silicon nitride ($Si_3N_4$), lithium nitride, titanium nitride, aluminum nitride, boron nitride, vanadium nitride, and zirconium nitride. Preferable among these is particulate silicon nitride because nano-size fine particles can be provided. Each of these particulate nitrides may be used alone, or two or more of these may be used in combination.

The particle diameter of the particulate inorganic nitride (D2) is not particularly limited; it is preferably 1000 nm or smaller, more preferably 300 nm or smaller, and further preferably 100 nm or smaller. The lower limit thereof is not particularly limited.

These particulate inorganic nitrides (D2) may be used in combination with an ammonia-generating compound (D1).

These oxazole cross-link system, thiazole cross-link system, and imidazole cross-link system are used for the following VdF rubber having a specific cross-linkable group and TFE/Pr rubber having a specific cross-linkable group.

(VdF Rubber Having Specific Cross-Linkable Group)

The specific VdF rubber is a VdF rubber which is a copolymer of VdF, at least one fluoroolefin selected from TFE, HFP, and fluoro(vinylether), and a monomer having a cyano group, carboxyl group, or alkoxycarbonyl group. The fluoroolefin is preferably a perfluoroolefin.

Here, it is important that the copolymerization ratio of the VdF is higher than 20 mol % in order to reduce weakness at low temperatures.

With respect to the fluoro(vinylether), one of the following compounds may be used or two or more of these may be used in combination. The compounds are those represented by formula (30):

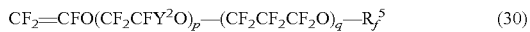

$$CF_2=CFO(CF_2CFY^2O)_p-(CF_2CF_2CF_2O)_q-R_f^5 \quad (30)$$

wherein $Y^2$ is a fluorine atom or $-CF_3$; $R_f^5$ is a C1-C5 perfluoroalkyl group; p is an integer of 0 to 5; q is an integer of 0 to 5, or those represented by formula (31):

$$CFX=CXOCF_2OR \quad (31)$$

wherein X is F or H; R is a C1-C6 linear or branched fluoroalkyl group, a C5-C6 cyclic fluoroalkyl group, or a fluorooxyalkyl group; 1 or 2 atoms selected from H, Cl, Br, and I may be included therein.

Preferable among those represented by formulas (30) and (31) are PAVE. Perfluoro(methyl vinyl ether) and perfluoro (propyl vinyl ether) are more preferable, and in particular perfluoro(methyl vinyl ether) is preferable.

Each of these may be used alone, or any of these may be used in combination.

The copolymerization ratio of the VdF and the specific fluoroolefin is not limited as long as the ratio of the VdF is higher than 20 mol %. A preferable VdF rubber contains 45 to 85 mol % of the VdF and 55 to 15 mol % of the specific fluoroolefin, and a more preferable VdF rubber contains 50 to 80 mol % of the VdF and 50 to 20 mol % of the specific fluoroolefin.

Specifically, the combination of the VdF and the specific fluoroolefin is preferably at least one copolymer selected from a VdF/HFP copolymer, VdF/HFP/TFE copolymer, VdF/PAVE copolymer, VdF/TFE/PAVE copolymer, VdF/HFP/PAVE copolymer, and VdF/HFP/TFE/PAVE copolymer.

In the VdF/HFP copolymer, the VdF/HFP composition is preferably 45 to 85/55 to 15 mol %, more preferably 50 to 80/50 to 20 mol %, and further preferably 60 to 80/40 to 20 mol %.

In the VdF/TFE/HFP copolymer, the VdF/TFE/HFP composition is preferably 40 to 80/10 to 35/10 to 35 mol %.

In the VdF/PAVE copolymer, the VdF/PAVE composition is preferably 65 to 90/35 to 10 mol %.

In the VdF/TFE/PAVE copolymer, the VdF/TFE/PAVE composition is preferably 40 to 80/3 to 40/15 to 35 mol %.

In the VdF/HFP/PAVE copolymer, the VdF/HFP/PAVE composition is preferably 65 to 90/3 to 25/3 to 25 mol %.

In the VdF/HFP/TFE/PAVE copolymerization, the VdF/HFP/TFE/PAVE composition is preferably 40 to 90/0 to 25/0 to 40/3 to 35, and more preferably 40 to 80/3 to 25/3 to 40/3 to 25 mol %.

The amount of the monomer having a cyano group, carboxyl group, or alkoxycarbonyl group is preferably 0.1 to 5 mol %, and more preferably 0.3 to 3 mol %, relative to the total amount of the VdF and the specific fluoroolefin for good cross-linking characteristics and heat resistance.

Examples of the monomer having a cyano group, carboxyl group, or alkoxycarbonyl group include monomers represented by formulas (32) to (35):

$$CY^1_2=CY^1(CF_2)_n-X^1 \quad (32)$$

wherein $Y^1$ is a hydrogen atom or a fluorine atom; n is an integer of 1 to 8;

$$CF_2=CFCF_2R_f^6-X^1 \quad (33)$$

wherein $R_f^6$ is $-(OCF_2)_n-$ or $-(OCF(CF_3))_n-$; n is an integer of 0 to 5;

$$CF_2=CF(OCF_2CF(CF_3))_mO(OCF_2)_n-X^1 \quad (34)$$

wherein m is an integer of 0 to 5; n is an integer of 1 to 8;

$$CF_2=CF(OCF_2CF(CF_3))_m-X^1 \quad (35)$$

wherein m is an integer of 1 to 5;
in formulas (32) to (35), $X^1$ is a cyano group (—CN group), carboxyl group (—COOH group), or alkoxycarbonyl group (—COOR group, R is a C1-C10 alkyl group optionally having a fluorine atom). Each of these may be used alone, or any of these may be used in combination.

The VdF rubber having these specific cross-linkable groups may be produced by a common method.

These cross-linkable groups may be introduced by the method disclosed in WO 00/05959.

The VdF rubber having a specific cross-linkable group preferably has a Mooney viscosity ($ML_{1+10}(121°C.)$) of 5 to 140, further preferably 5 to 120, and particularly preferably 5 to 100, for good processability.

(TFE/Pr Rubber Having Specific Cross-Linkable Group)

The TFE/PR rubber having a specific cross-linkable group is a non-perfluororubber having 40 to 70 mol % of TFE units, 30 to 60 mol % of Pr units, and monomer units having cyano groups, carboxyl groups, or alkoxycarbonyl groups.

The rubber may have 0 to 15 mol % of VdF units and/or 0 to 15 mol % of PAVE units if necessary.

The amount of the TFE units is 40 to 70 mol %, and preferably 50 to 65 mol %; the TFE units in such an amount provide elastomeric properties with Pr units.

The amount of the Pr units is 30 to 60 mol %, and preferably 35 to 50 mol %; the Pr units in such an amount provide elastomeric properties with TFE units.

With respect to the monomers having a cyano group, carboxyl group, or alkoxycarbonyl group, the monomers mentioned as preferable for the VdF rubber having a specific cross-linkable group can be also used for the TFE/Pr rubber having a specific cross-linkable group.

The amount of the VdF units or PAVE units, which are not essential units, is preferably up to 15 mol %, and further preferably up to 10 mol %. A larger amount of the former units causes poor amine resistance, while a larger amount of the latter units causes high cost.

The TFE/Pr rubber having a specific cross-linkable group generally has a Mooney viscosity ($ML_{1+10}(121°C.)$) of 5 to 100. A Mooney viscosity of less than 5 causes poor cross-linkability, so that a cross-linked rubber cannot have sufficient physical properties. In contrast, a Mooney viscosity of higher than 100 causes poor fluidity, and thus tends to cause poor molding processability. The Mooney viscosity ($ML_{1+10}(121°C.)$) is preferably 10 to 80.

The TFE/Pr rubber having a specific cross-linkable group may be produced by a common emulsion polymerization method, but the polymerization rate of TFE and Pr is relatively slow in this method. In the two-step polymerization (seed polymerization) method, for example, the rubber can be efficiently produced.

The amount of the oxazole, thiazole, or imidazole cross-linking agent is preferably 0.1 to 20 parts by mass, and more preferably 0.5 to 10 parts by mass, to 100 parts by mass of the specific fluororubber. If the amount of the cross-linking agent is less than 0.1 parts by mass, the mechanical strength, heat resistance, and chemical resistance tend not to be sufficient for practical use. In contrast, if the amount thereof is more than 20 parts by mass, cross-linking tends to take a long time and a cross-linked product tends to be hard, likely resulting in flexibility loss.

In the case of using a cross-linking aid (D) in combination in these oxazole cross-link system, thiazole cross-link system, and imidazole cross-link system, the amount of the cross-linking aid (D) is 0.01 to 10 parts by mass, preferably 0.02 to 5 parts by mass, and more preferably 0.05 to 3 parts by mass, to 100 parts by mass of the aforementioned specific fluororubber, in general.

(Triazine Cross-Link System)

The triazine cross-link system is a cross-link system which causes a low compression set and excellent heat resistance. In the triazine cross-link system, only a cross-linking aid (D) that initiates cross-linking reaction is used.

Examples of the cross-linking aid (D) used in the triazine cross-link system include (D1) compounds generating ammonia at 40° C. to 330° C. and (D2) particulate inorganic nitrides which are cross-linking aids capable of being used together with a cross-linking agent in the oxazole cross-link system, thiazole cross-link system, and imidazole cross-link system.

Of the specific cross-linkable group-containing fluororubbers which are the targets of the oxazole cross-link system, thiazole cross-link system, and imidazole cross-link system, the target fluororubber of the triazine cross-link system is preferably a fluororubber in which at least one cross-linkable group is a cyano group.

The amount of the ammonia-generating compound (D1) may be appropriately adjusted depending on the amount of ammonia to be generated. In general, the amount thereof is 0.05 to 10 parts by mass, preferably 0.1 to 5 parts by mass, and more preferably 0.2 to 3 parts by mass, to 100 parts by mass of the cyano group-containing fluororubber. Too small an amount of the ammonia-generating compound tends to cause a low cross-linking density, so that the heat resistance and chemical resistance tend to be insufficient for practical use. In contrast, too large an amount thereof may cause scorch, so that the storage stability tends to be poor.

The amount of the particulate inorganic nitride (D2) is generally 0.1 to 20 parts by mass, preferably 0.2 to 5 parts by mass, and more preferably 0.2 to 1 parts by mass, to 100 parts by mass of the cyano group-containing fluororubber. If the amount of the particulate inorganic nitride (D2) is less than 0.1 parts by mass, the cross-linking density tends to be low, so that the heat resistance and chemical resistance tend to be insufficient for practical use. If the amount thereof is more than 20 parts by mass, scorch may occur, so that the storage stability tends to be poor.

In the present invention, the cross-link system is preferably the polyol cross-link system, peroxide cross-link system, oxazole cross-link system, thiazole cross-link system, imidazole cross-link system, or triazine cross-link system. Particularly preferable is the polyol cross-link system, oxazole cross-link system, thiazole cross-link system, imidazole cross-link system, or triazine cross-link system in view of crack resistance at high temperatures and high compression and sealability under high-temperature conditions. In the respective cross-link systems, it is preferred to use a suitable cross-linking agent (C) or cross-linking aid (D).

If necessary, the fluororubber composition of the present invention may further contain common additives for rubber such as filler, processing aid, plasticizer, colorant, tackifier, adhesion promoter, acid acceptor, pigment, flame retardant, lubricant, photo stabilizer, weather-resistant stabilizer, antistatic agent, ultraviolet absorber, antioxidant, release agent, foaming agent, perfume, oil, and softener, and other polymers such as polyethylene, polypropylene, polyamide, polyester, and polyurethane to the extent that the effects of the present invention are not deteriorated.

Examples of the filler include: metal oxides such as calcium oxide, magnesium oxide, titanium oxide, and aluminum oxide; metal hydroxides such as magnesium hydroxide, aluminum hydroxide, and calcium hydroxide; carbonates such as magnesium carbonate, aluminum carbonate, calcium carbonate, and barium carbonate; silicates such as magnesium silicate, calcium silicate, sodium silicate, and aluminum silicate; sulfates such as aluminum sulfate, calcium sulfate, and barium sulfate; metal sulfides such as synthesized hydrotalcite, molybdenum disulfide, iron sulfide, and copper sulfide; diatomaceous earth, asbestos, lithopone (zinc sulfide/barium sulfide), graphite, carbon fluoride, calcium fluoride, coke, fine particulate quartz, zinc oxide, talc, powdery mica, Wollastonite, fibrous carbon, fibrous aramid, various whiskers, fibrous glass, organic reinforcing agent, organic filler, polytetrafluoroethylene, mica, silica, celite, and clay. Further, examples of the acid acceptor include calcium oxide, magnesium oxide, lead oxide, zinc oxide, magnesium hydroxide, calcium hydroxide, aluminum hydroxide, and hydrotalcite. Each of these may be used alone, or two or more of these may be appropriately used in combination. These may be added at any step in the aforementioned mixing method; they are preferably added upon mixing the fluororubber and the carbon black with an internal mixer or a roll mixer.

Examples of the processing aid include: higher fatty acids such as stearic acid, oleic acid, palmitic acid, and lauric acid; higher fatty acid salts such as sodium stearate and zinc stearate; higher fatty acid amides such as stearamide and oleamide; higher fatty acid esters such as ethyl oleate; petroleum wax such as carnauba wax and ceresin wax; polyglycols such as ethylene glycol, glycerine, and diethylene glycol; aliphatic hydrocarbons such as vaseline and paraffin; silicone oils, silicone polymers, low molecular weight polyethylene, phthalic acid esters, phosphoric acid esters, rosin, (halogenated) dialkylamines, surfactants, sulfone compounds, fluorine aids, and organic amine compounds.

In particular, the organic amine compound and the acid acceptor are preferable additives because, in the case that they are blended upon mixing the fluororubber (A) and the carbon black (B) with an internal mixer or a roll mixer, they improve reinforceability. The mixing is preferably performed at the highest mixing temperature Tm of 80° C. to 220° C.

Preferable examples of the organic amine compound include primary amines represented as $R^1NH_2$, secondary amines represented as $R^1R^2NH$, and tertiary amine represented as $R^1R^2R^3N$. $R^1$, $R^2$, and $R^3$ may be the same as or different from each other and each of these is preferably a C1-C50 alkyl group. The alkyl group may have a benzene ring as a functional group, or may have a double bond and/or conjugated double bond. Further, the alkyl group may have a linear shape or a branched shape.

Examples of the primary amine include coconut amine, octyl amine, lauryl amine, stearyl amine, oleyl amine, beef tallow amine, 17-phenyl-heptadecylamine, octadeca-7,11-dienylamine, octadeca-7,9-dienylamine, octadec-9-enylamine, 7-methyl-octadec-7-enylamine. Examples of the secondary amine include distearylamine. Examples of the tertiary amine include dimethyloctylamine, dimethyldecylamine, dimethyllaurylamine, dimethylmyristylamine, dimethylpalmitylamine, dimethylstearylamine, and dimethylbehenylamine. Particularly preferable are amines, especially primary amines, having about 20 carbon atoms because they are easily available and they improve reinforceability.

The amount of the organic amine compound is preferably 0.01 to 5 parts by mass to 100 parts by mass of the fluororubber (A). Too large an amount of the organic amine compound tends to cause difficulty in mixing, while too small an amount thereof tends to cause poor reinforceability. The amount with respect to 100 parts by mass of the fluororubber (A) is further preferably 0.1 parts by mass or more from the viewpoint of reinforceability and 4 parts by mass or less from the viewpoints of reinforceability and easy mixing.

The acid acceptor is preferably a metal hydroxide such as calcium hydroxide; a metal oxide such as magnesium oxide or zinc oxide; or hydrotalcite among the aforementioned examples from the viewpoint of reinforceability, for example, and it is particularly preferably zinc oxide.

The amount of the acid acceptor is preferably 0.01 to 10 parts by mass to 100 parts by mass of the fluororubber (A). Too large an amount of the acid acceptor tends to cause poor physical properties, while too small an amount thereof tends to cause poor reinforceability. The amount with respect to 100 parts by mass of the fluororubber (A) is further preferably 0.1 parts by mass or more from the viewpoint of reinforceability, while it is preferably 8 parts by mass or less, and more preferably 5 parts by mass or less, from the viewpoints of physical properties and easy mixing.

Examples of the tackifier include coumarone resin, coumarone-indene resin, coumarone-indene-styrene resin, naphthene resin, phenol resin, rosin, rosin ester, hydrogen additive rosin derivative, terpene resin, modified terpene resin, terpene-phenol resin, hydrogen additive terpene resin, α-pinene resin, alkylphenol-acethylene resin, alkylphenol-formaldehyde resin, styrene resin, C5-petroleum resin, C9 petroleum resin, cycloaliphatic petroleum resin, C5/C9 copolymer petroleum resin, xylene-formaldehyde resin, polyfunctional methacrylates, polyfunctional acrylates, metal oxides (e.g. magnesium oxide), and metal hydroxides. The amount thereof is preferably 1 to 20 parts by mass to 100 parts by mass of the fluororubber (A). These tackifier may be used alone, or two or more of these may be used in combination.

The sealing material of the present invention has a cross-linked fluororubber layer obtainable by cross-linking the fluororubber composition of the present invention.

In the present invention, the fluororubber composition may be cross-linked by an appropriately selected method. Examples of the method include a cross-linking and molding method using a common rubber molding machine. Examples of the molding machine for rubber include a compression press, a transfer molding machine, and an injection molding machine. A rubber composition is premolded in a predetermined shape using a roll mixer, a mixing machine, an extrusion machine, or a premolding machine, and heated to be first cross-linked. The sealing material formed through the first cross-linkage is desirably subjected to secondry curing in an air oven.

The obtained cross-linked fluororubber layer has a loss modulus E" of 600 kPa or higher and 6000 kPa or lower determined by a dynamic viscoelasticity test under conditions of measurement mode: tensile, chuck distance: 20 mm, measurement temperature: 160° C., tensile strain: 1%, initial force: 157 cN, and frequency: 10 Hz.

If the loss modulus E" is within the above range, the rubber layer has particularly excellent crack resistance at high temperatures and high compression. The lower limit thereof is preferably 620 kPa, and more preferably 630 kPa. The upper limit thereof is preferably 5,900 kPa, and more preferably 5,800 kPa.

For improved crack resistance at high temperatures and high compression, the cross-linked fluororubber layer further preferably has a storage modulus E' of 1,500 kPa or higher and 20,000 kPa or lower determined by a dynamic viscoelasticity test under conditions of measurement mode: tensile, chuck distance: 20 mm, measurement temperature: 160° C., tensile strain: 1%, initial force: 157 cN, and frequency: 10 Hz. The lower limit thereof is preferably 1,600 kPa, and more preferably 1,800 kPa, while the upper limit thereof is preferably 19,000 kPa, and more preferably 18,000 kPa.

The sealing materials of present invention can be suitably used in the following fields.

Sealing materials may be used, for example, for vehicles, specifically in the engine body, main driving system, valve gear system, lubricant and cooling system, fuel system, and air inhalation and exhaust system, of the engine; transmissions of the drive system; the steering system of the chassis; the braking system; and the basic electrical components, controlling electric components, and equipment electric components. In such a field, the sealing material is required to have heat resistance, oil resistance, fuel oil resistance, engine coolant antifreeze resistance, and steam resistance. Examples of such a sealing material include gaskets and contact or non-contact packings (e.g. self-sealing packings, piston rings, split ring packings, mechanical seals, oil seals).

The sealing material used for the engine body of a vehicle engine is not particularly limited, and examples thereof include cylinder head gaskets, cylinder head cover gaskets, oil pan packings, common gaskets, O-rings, packings, and timing belt cover gaskets.

Examples of the sealing material used for the main driving system of a vehicle engine include, but not particularly limited to, shaft seals such as a crank shaft seal and a cam shaft seal.

Examples of the sealing material used for the valve gear system of a vehicle engine include, but not particularly limited to, valve stem oil seals for an engine valve, and valve seats of a butterfly valve.

Examples of the sealing material used for the lubricant and cooling system of a vehicle engine include, but not particularly limited to, seal gaskets for an engine oil cooler.

Examples of the sealing material used for the fuel system of a vehicle engine include, but not particularly limited to, oil seals for a fuel pump, filler seals and tank packings for a fuel tank, connector O-rings for a fuel tube, injector cushion rings, injector seal rings, and injector O-rings for a fuel injection device, flange gaskets for a carburetor, and sealing materials for EGR.

Examples of the sealing material used for the air inhalation and exhaust system of a vehicle engine include, but not particularly limited to, induction manifold packings and exhaust manifold packings for a manifold, throttle body packings for a throttle, and turbine shaft seals for a turbo charger.

Examples of the sealing material used for the transmissions of a vehicle include, but not particularly limited to, bearing seals, oil seals, O-rings, and packings for a transmission; and O-rings and packings for an automatic transmission.

Examples of the sealing material used for the braking system of a vehicle include, but not particularly limited to, oil seals, O-rings, packings, piston cups (rubber cups) of master cylinders, caliper seals, and boots.

Examples of the sealing material used for the equipment electrical component of a vehicle include, but not particularly limited to, O-rings and packings for a car air-conditioner.

The sealing material of the present invention is particularly suitable as a sealing material for a sensor (bush), and more suitable as a sealing material for an oxygen sensor, a sealing material for a nitrogen oxide sensor, and a sealing material for a sulfur oxide sensor. O-rings herein may be square rings.

The sealing material may be applied to any field other than the field of vehicles. The sealing material can be used in a wide range of fields such as fields of aircraft, rocket, shipping, oil well drilling, chemical products (e.g. plants), medical products (e.g. drugs), photographing (e.g. developing machines), printing (e.g. printing machines), coating (e.g. coating facility), analysis/physical and chemical appliances, food plant appliances, nuclear plant appliances, steals (e.g. steel plate processing equipment), general industries, electrics, fuel cells, electronic components, and site-operation molding.

Examples of such a sealing material include packings, O-rings, and other sealing materials having oil resistance, chemical resistance, heat resistance, steam resistance or weather resistance in transportation facilities such as ships and boats, and aircrafts; similar packings, O-rings, and other sealing materials (e.g. packer seal, seal for LWD, seal for MWD) in oil well drilling; similar packings, O-rings, and other sealing materials in chemical plants; similar packings, O-rings, and other sealing materials in food plant appliances and food appliances (including household products); similar packings, O-rings, and other sealing materials in nuclear plant appliances; and similar packings, O-rings, and other sealing materials in general industrial components.

The seal material of the present invention is suitable for the diaphragms described below.

Examples of the diaphragms include those for vehicle engines, specifically those used in the fuel system, exhaust system, braking system, drive system, and ignition system, which need to have heat resistance, oxidation resistance, fuel resistance, and low gas permeability.

Examples of the diaphragms used in the fuel system of a vehicle engine include: diaphragms for fuel pumps, diaphragms for carburetors, diaphragms for pressure regulators, diaphragms for pulsation dampers, diaphragms for ORVR, diaphragms for canisters, and diaphragms for auto fuel cocks.

Examples of the diaphragms used in the exhaust system of a vehicle engine include: diaphragms for waste gates, diaphragms for actuators, and diaphragms for EGR.

Examples of the diaphragms used in the braking system of a vehicle engine include diaphragms for air braking.

Examples of the diaphragms used in the drive system of a vehicle engine include diaphragms for oil pressure.

Examples of the diaphragms used in the ignition system of a vehicle engine include diaphragms for distributors.

Examples of the diaphragms in addition to those for vehicle engines includes: diaphragms for general pumps, diaphragms for valves, diaphragms for filter press, diaphragms for blower, diaphragms for air conditioners, diaphragms for control equipments, diaphragms for water supply, diaphragms for pumps transferring hot water used for hot-water supply and the like, diaphragms for high-temperature steam, diaphragms for semiconductor devices (for example, diaphragms for transferring chemicals used in a manufacturing process), diaphragms for food-processing devices, diaphragms for liquid storage tanks, diaphragms for pressure switches, diaphragms used oil exploration and oil drilling (for example, diaphragms for lubricant oil supply, such as oil drill bits), diaphragms for gas appliances such as instantaneous gas water heaters and gas meters, diaphragms for accumulators, diaphragms for air springs such as suspensions, diaphragms for screw feeders for ships and boats, and diaphragms for medical artificial hearts, which need to have heat resistance, oil resistance, chemical resistance, steam resistance, and low gas permeability.

EXAMPLES

The present invention will be described referring to, but not limited to, examples.
Measurement methods of physical properties adopted in the present invention are as follows.
(1) Dynamic Viscoelasticity Test 1 (Loss Modulus E" and Storage Modulus E')
(Measurement Device)
Dynamic viscoelasticity measurement device DVA-220 (IT Keisoku Seigyo K.K.)
(Measurement Conditions)
Strain distribution is measured under the following conditions, and then the loss modulus E" and the storage modulus E' at 1% tensile strain are calculated.
Specimen: cross-linked rubber cuboid having a size of 3 mm in width×2 mm in thickness
Measurement mode: tensile
Chuck distance: 20 mm
Measurement temperature: 160° C.
initial force: 157 cN
Frequency: 10 Hz
(2) Dynamic Viscoelasticity Test 2 (Shear Modulus G')
(Measurement Device)
Rubber process analyzer (model: RPA2000, ALPHA TECHNOLOGY Co., LTD.)
(Measurement Conditions)
Strain distribution is measured at 100° C. and 1 Hz, whereby the shear modulus G' is determined. At this time, G' is measured for the respective dynamic strains 1% and 100%, and thereby δG' (G'(1%)−G'(100%)) is calculated.
(3) Crack Resistance Test
Crack resistance is measured in accordance with JIS-K 6262 using a large-sized specimen for a compression set test. A testing device is a compression device used in a compression set test in accordance with JIS-K 6262-5. A spacer providing 55% compression of a specimen was used. Circle expresses a specimen with no cracks. Cross expresses a specimen with cracks.
(4) Mooney Viscosity ($ML_{1+10}(100°$ C.))
The Mooney viscosity was determined in accordance with ASTM-D 1646 and JIS-K 6300. The measurement temperature is 100° C.
In the examples and comparative examples, the following fluororubber, carbon black, cross-linking agent, and cross-linking accelerator were used.
(Fluororubber)
A: Pure water (44 L), a 50% aqueous solution of $CH_2=CFCF_2OCF(CF_3)CF_2OCF(CF_3)COONH_4$ (8.8 g), and a 50% aqueous solution of $F(CF2)3COONH4$ (176 g) were charged into a 82-L stainless-steel autoclave, and the air inside the system was sufficiently replaced with nitrogen gas. The mixture was stirred at 230 rpm and heated to 80° C., and then monomers were injected so that the initial monomer composition in the tank was VdF/HFP=50/50 mol % and 1.52 MPa was achieved. A polymerization initiator solution prepared by dissolving APS (1.0 g) into pure water (220 ml) was injected using nitrogen gas, and thus a reaction was initiated. When the internal pressure was down to 1.42 MPa as the polymerization proceeded, a mixed monomer (VdF/HFP=78/22 mol %), which is an additional monomer, was injected until the internal pressure reached 1.52 MPa. At this time, a diiodine compound I(CF2)4I (73 g) was injected. While the pressure was repeatedly increased and decreased, an aqueous solution of APS (1.0 g)/pure water (220 ml) was injected using nitrogen gas every 3 hours, and thereby the polymerization reaction was continued. As 14,000 g in total of the mixed monomer was added, unreacted monomers were removed and the autoclave was cooled down. Thereby, a fluororubber dispersion with a solid content concentration of 23.1% by mass was obtained. NMR analysis on the fluororubber showed that the copolymer composition was VdF/HFP=78/22 (mol %), and the Mooney viscosity (ML1+10 (100° C.)) was 55. This fluororubber was named Fluororubber A.
(Carbon Black)
B1: HAF ($N_2SA$=79 $m^2$/g, DBP oil absorption=101 ml/100 g), "SEAST 3" (trade name, Tokai Carbon Co., Ltd.)
B2: MT ($N_2SA$=8 $m^2$/g, DBP oil absorption=43 ml/100 g), "Thermax N 990" (trade name, Cancarb)
(Cross-Linking Agent)
Bisphenol AF
(Cross-Linking Accelerator)
DBU-B
Calcium hydroxide: CALDIC 2000 (trade name, Ohmi Chemical Industry Co., LTD.)
Magnesium oxide: MA-150 (trade name, Kyowa Chemical Industry Co., Ltd.)

Example 1

An amount of 100 parts by mass of a fluororubber A was mixed with 15 parts by mass of a carbon black B1 using a mixer (DS 3-7.5 product of MORIYAMA COMPANY LTD.) under the mixing conditions of front rotor speed of 53 rpm and back rotor speed of 47 rpm. Thereby, a fluororubber precompound was prepared. The maximum temperature of the discharged mixed product was 162° C.
Thereafter, the fluororubber precompound was mixed with 1.5 parts by mass of a solid solution (made from bisphenol AF and DBU-B mixed at a mass ratio of 4:1, melted at 150° C. for 1 to 2 hours, and cooled and ground) of a cross-linking agent and a cross-linking accelerator (DBU-B); 6 parts by mass of CALDIC2000; and 3 parts by mass of MA-150 for 30 minutes using an 8-inch open roll mixer (KANSAI ROLL Co., Ltd.) under the mixing conditions of front roll speed of 21 rpm, back roll speed of 19 rpm, and gap distance between rolls of 0.1 cm. Thereby, a fluororubber full compound was prepared. The maximum temperature of the discharged mixed product was 71° C.
The resulting fluororubber compound was subjected to the dynamic viscoelasticity test 2, and thereby the δG' was determined. Table 1 shows the results.
The fluororubber compound was press-molded at 170° C. for 10 minutes, and heated in an oven at 230° C. for 24 hours to prepare a 2-mm-thick sheet specimen and a large specimen for a compression set test. The resulting cross-linked fluororubber was subjected to the dynamic viscoelasticity test 1, and the loss modulus E" and the storage modulus E' were determined. Table 1 shows the results.

A compression device was preheated to the temperature shown in Table 1. The resulting specimen was inserted to the center portion of a compression plate, and a spacer was inserted to either side of the specimen. The compression plate was compressed to be closely-attached to the spacer. The compression plate and the spacer were tightly fastened with a holding tool and settled in the state.

The compression device was immediately put into a high temperature oven, which was preadjusted to the test temperature shown in Table 1, and then heated for the time shown in Table 1.

After completion of the heating, the compression device was taken out from the high temperature oven, and the specimen was removed from the compression device. The specimen was visually observed to determine the presence or absence of a crack. Table 1 shows the results.

Example 2

An amount of 100 parts by mass of the fluororubber A was mixed with the carbon black B1 in the amount shown in Table 1 for 30 minutes using an 8-inch open roll mixer (KANSAI ROLL Co., Ltd.) under the conditions of front roll speed of 21 rpm, back roll speed of 19 rpm, and gap distance between rolls of 0.1 cm. Thereby, a fluororubber precompound was prepared. The maximum temperature of the discharged mixed product was 72° C.

Thereafter, the fluororubber precompound was mixed with 1.5 parts by mass of a solid solution (made from bisphenol AF and DBU-B mixed at a mass ratio of 4:1, melted at 150° C. for 1 to 2 hours, and cooled and ground) of a cross-linking agent (C1) and a cross-linking accelerator (DBU-B); 6 parts by mass of CALDIC 2000; and 3 parts by mass of MA-150 for 30 minutes using an 8-inch open roll mixer (KANSAI ROLL Co., Ltd.) under the mixing conditions of front roll speed of 21 rpm, back roll speed of 19 rpm, and roll surface temperature of 30° C. Thereby, a fluororubber full compound was prepared. The maximum temperature of the discharged mixed product was 70° C. The resulting fluororubber full compound was subjected to the dynamic viscoelasticity test 2, and thereby the δG' was determined.

The fluororubber full compound is press-molded at 170° C. for 10 minutes, and heated at 230° C. in an oven for 24 hours. Thereby, a 2-mm-thick sheet specimen and a large specimen for a compression set test were prepared. The resulting cross-linked fluororubber was subjected to the dynamic viscoelasticity test 1, and the loss modulus E" and the storage modulus E' were determined. Table 1 shows the results.

A compression device was preheated to the temperature shown in Table 1. The resulting specimen was inserted to the center portion of a compression plate, and a spacer was inserted to either side of the specimen. The compression plate was compressed to be closely-attached to the spacer. The compression plate and the spacer were tightly fastened with a holding tool and settled in the state.

The compression device was immediately put into a high temperature oven which was preadjusted to the test temperature shown in Table 1, and then heated for the time shown in Table 1.

After completion of the heating, the compression device was taken out from the high temperature oven, and the specimen was removed from the compression device. The specimen was visually observed to determine the presence or absence of a crack. Table 1 shows the results.

Comparative Example 1

Conditions in Comparative Examples 1 were the same as those in Example 2 except that the carbon black B2 was used instead of the carbon black B1. Table 1 shows the results.

TABLE 1

|  | Example 1 | Example 2 | Comparative Example 1 |
|---|---|---|---|
| Composition (parts by mass) | | | |
| Fluororubber A | 100 | 100 | 100 |
| Carbon black B1 | 15 | 15 | — |
| Carbon black B2 | — | — | 15 |
| Solid solution of cross-linking agent and cross-linking accelerator | 1.5 | 1.5 | 1.5 |
| Calcium hydroxide | 6 | 6 | 6 |
| Magnesium oxide | 3 | 3 | 3 |
| Press cross-linking conditions | 170° C., 10 min | 170° C., 10 min | 170° C., 10 min |
| Difference δG' (G'(1%) - G'(100%)) | 281 | 265 | 180 |
| Oven cross-linking conditions | 230° C., 24 h | 230° C., 24 h | 230° C., 24 h |
| Crack resistance | | | |
| 280° C. × 24 hours | ○ | x | x |
| 200° C. × 48 hours | ○ | x | x |
| 175° C. × 48 hours | ○ | ○ | x |
| 150° C. × 48 hours | ○ | ○ | x |
| Dynamic viscoelasticity test (160° C.) | | | |
| Storage modulus E' (kPa) | 7805 | 7958 | 2894 |
| Loss modulus E" (kPa) | 1326 | 1332 | 526 |

The invention claimed is:

1. A packer seal comprising
a cross-linked fluororubber layer obtainable by cross-link-molding a fluororubber composition containing a fluororubber (A) and a carbon black (B),
the cross-linked fluororubber layer having a loss modulus E" of 600 to 6,000 kPa determined by a dynamic viscoelasticity test under conditions of measurement temperature:
160° C., tensile strain: 1%, initial force: 157 cN, and frequency: 10 Hz,
wherein the fluororubber (A) is at least one copolymer selected from the group consisting of a vinylidene fluoride (VdF)/hexafluoropropylene (HFP) copolymer, copolymer of VdF/fluorine-containing monomer (2) of formula (2):
$CH_2=CFR_f$ (2)
wherein $R_f$ is a C1-C12 linear or branched fluoroalkyl group, and VdF/perfluoro(alkyl vinyl ether) (PAVE) copolymer,
the VdF/HFP copolymer consists of a VdF repeating unit and a HFP repeating unit, and the VdF/PAVE copolymer consists of a VdF repeating unit and a PAVE repeating unit and
the carbon black (B) comprises at least one carbon black selected from the group consisting of SAF-HS, SAF, N234, ISAF, ISAF-LS, ISAF-HS, N339, HAF-LS, HAF-HS, HAF, N351 and LI-HAF.

2. The packer seal according to claim 1,
wherein the cross-linked fluororubber layer has a storage modulus E' of 1,500 to 20,000 kPa determined by a dynamic viscoelasticity test under conditions of measurement temperature: 160° C., tensile strain: 1%, initial force: 157 cN, and frequency: 10 Hz.

3. The packer seal according to claim 1,
wherein the fluororubber composition contains 5 to 50 parts by mass of the carbon black (B) to 100 parts by mass of the fluororubber (A).

4. The packer seal according to claim 1,
wherein the fluororubber composition further contains a cross-linking agent (C) and/or a cross-linking aid (D).

* * * * *